(12) United States Patent
Hatano

(10) Patent No.: US 10,082,729 B2
(45) Date of Patent: Sep. 25, 2018

(54) PROJECTOR

(71) Applicant: SEIKO EPSON CORPORATION, Tokyo (JP)

(72) Inventor: Takuya Hatano, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/710,106

(22) Filed: Sep. 20, 2017

(65) Prior Publication Data
US 2018/0088449 A1    Mar. 29, 2018

(30) Foreign Application Priority Data

Sep. 29, 2016  (JP) ................................ 2016-192016
Sep. 29, 2016  (JP) ................................ 2016-192017

(51) Int. Cl.
*G03B 21/14* (2006.01)
*G02B 7/02* (2006.01)

(52) U.S. Cl.
CPC ........... *G03B 21/142* (2013.01); *G02B 7/023* (2013.01); *G03B 21/147* (2013.01)

(58) Field of Classification Search
CPC ......... G02B 7/02; G02B 7/023; G03B 21/142
USPC ............................................ 353/101, 69, 70
See application file for complete search history.

(56) References Cited

U.S. PATENT DOCUMENTS

| | | | | |
|---|---|---|---|---|
| 5,895,110 A * | 4/1999 | Okada | ................. | H04N 5/7441 348/E5.141 |
| 9,229,300 B2 | 1/2016 | Hellin et al. | | |
| 2002/0154278 A1* | 10/2002 | Masuda | ................... | G02B 7/02 353/101 |
| 2011/0310364 A1* | 12/2011 | Wakabayashi | ....... | G03B 21/142 353/101 |
| 2012/0229771 A1* | 9/2012 | Hashimoto | ............ | G02B 7/004 353/7 |
| 2014/0092371 A1* | 4/2014 | Nemura | ............... | G03B 21/142 353/101 |
| 2015/0268539 A1* | 9/2015 | Sakai | ................... | G03B 21/142 353/101 |

FOREIGN PATENT DOCUMENTS

JP    2015-200792 A    11/2015

* cited by examiner

*Primary Examiner* — William C Dowling
(74) *Attorney, Agent, or Firm* — Oliff PLC

(57) ABSTRACT

A projector includes a light source device, a light modulating device, a projection optical device, and an adjusting device that rotates the projection optical device about a rotation axis along a direction orthogonal to a central axis of the projection optical device. The adjusting device includes a rotating member that supports the projection optical device and rotates about the rotation axis, a support member that supports the rotating member, and a drive device that rotates the rotating member. The drive device includes a motor and a transmission device that rotates the rotating member with power of the motor. The motor includes a spindle that transmits the power to the transmission device. The spindle is disposed along the rotation axis.

12 Claims, 25 Drawing Sheets

PROJECTOR

BACKGROUND

1. Technical Field

The present invention relates to a projector. The entire disclosure of Japanese Patent Application No. 2016-192016, filed on Sep. 29, 2016 and Japanese Patent Application No. 2016-192017, filed on Sep. 29, 2016 are expressly incorporated by reference herein.

2. Related Art

Projectors including a light source device, a light modulating device that modulates light emitted from the light source device to form an image in response to image information, and a projection optical device that projects the formed image onto a projection surface such as a screen have been known in the related art. As the projector, a projector (projection-type display device) including a shift adjusting section that supports a projection optical device and moves the projection optical device in a direction orthogonal to the optical axis of the projection optical device to thereby adjust the projection position of an image has been known (e.g., see JP-A-2015-200792).

In the projector disclosed in JP-A-2015-200792, the shift adjusting section includes a first moving member to which the projection optical device (projection lens) is fixed, a second moving member that movably holds the first moving member in the left-and-right direction, and a fixed member that movably holds the second moving member in the up-and-down direction. When a corresponding dial is rotated, the first moving member moves in the left-and-right direction along a first guide bar and a second guide bar that are located on the opposite sides so as to interpose the first moving member therebetween and are along the left-and-right direction. Moreover, when a corresponding dial is rotated, the second moving member moves in the up-and-down direction along a third guide bar and a fourth guide bar that are similarly located on the opposite sides so as to interpose the second moving member therebetween and are along the up-and-down direction.

The first moving member includes a correcting mechanism that corrects the image plane tilt of the projection lens. The correcting mechanism includes a first engaging member, an elastic member, an adjusting screw, and a second engaging member.

The first engaging member is provided at an end portion on the side opposite to the first guide bar side in the first moving member. The first engaging member includes a hole through which the adjusting screw is inserted. The elastic member is a spring through which the shaft of the adjusting screw is inserted, and is disposed between the first engaging member and the second engaging member. The second engaging member includes a guide portion with which the first engaging member slidably engages, and an engaging portion that engages with the second guide bar.

When the adjusting screw is rotated, a gap in a direction along the optical axis between the first engaging member and the second engaging member is changed by an elastic force of the elastic member and a pressure applied by the adjusting screw, and thus the first moving member finely rotates about the first guide bar to incline the projection optical device. With this configuration, the image plane tilt of the projection optical device is adjusted, and a one-sided blur in a projection image is adjusted.

In the projector disclosed in JP-A-2015-200792, an adjuster such as a user or a manufacturer's engineer needs to rotate the adjusting screw, while checking the projection image, to adjust the position of the projection optical device. In such a case, there is the need to rotate the adjusting screw while checking the projection image, which is inconvenient.

In contrast to this, it is considered to automatically incline the projection optical device by rotating the adjusting screw with a motor as a drive device.

However, for example when a spindle of the motor is disposed coaxially with the adjusting screw, the first moving member rotates if an unexpected impact such as a fall is applied to the projector, and thus there is a possibility that an impact in a direction along the central axis of the spindle may be applied to the spindle. In such a case, there is a problem in that the configuration of the projector is complicated such that, for example, the first moving member needs to be configured so as not to be moved by the impact.

On the other hand, in the projector disclosed in JP-A-2015-200792, the first moving member is moved in the left-and-right direction and rotated about the first guide bar. The first guide bar is engaged with the end portion of the first moving member. Therefore, when the first moving member and thus the projection optical device are inclined, the back focus position of the projection optical device is shifted. Therefore, there is a possibility that the light modulated by the light modulating device cannot be properly projected by the projection optical device.

SUMMARY

An advantage of some aspects of the invention is to provide a projector whose reliability can be improved.

Another advantage of some aspects of the invention is to provide a projector that can properly carry out projection with a projection optical device after position adjustment.

A projector according to a first aspect of the invention includes: a light source device; a light modulating device that modulates light emitted from the light source device; a projection optical device that projects modulated light modulated by the light modulating device and incident on the projection optical device; and an adjusting device that rotates the projection optical device about a rotation axis along a second direction orthogonal to a first direction along a central axis of the projection optical device to adjust an inclination of the projection optical device with respect to the modulated light incident on the projection optical device, wherein the adjusting device includes a rotating member that supports the projection optical device and rotates about the rotation axis, a support member that rotatably supports the rotating member, and a drive device that is provided on the support member and rotates the rotating member, the drive device includes a motor that generates power to rotate the rotating member, and a transmission device that engages with the rotating member to rotate the rotating member with the power generated by the motor, the motor includes a spindle that engages with the transmission device to transmit the power to the transmission device, and the spindle is disposed along the rotation axis.

According to this configuration, the spindle of the motor generating the power to rotate the rotating member with the transmission device is disposed so as to be along the rotation axis of the rotating member. According to this configuration, even when the rotating member supporting the projection optical device having a relatively large weight, among the members constituting the projector, unintendedly rotates about the rotation axis because of some impact applied to the projector, a load along the central axis of the spindle can be prevented from being applied to the spindle. Moreover, the spindle is disposed along the rotation axis; therefore, even when the rotating member unintendedly rotates and a load in a direction orthogonal to the central axis of the spindle is applied, the spindle rotates according to the load and thus the load can be relieved. Accordingly, since the adjusting device can be stably operated, the reliability of the projector can be improved.

In the first aspect, it is preferable that the transmission device includes a worm that is connected to the spindle, a worm wheel that meshes with the worm, a shaft member that includes a spiral groove on an outer periphery, is provided coaxially with the worm wheel, and rotates together with the worm wheel, and a container that is provided on the support member and rotatably accommodates the shaft member, that the container includes an opening through which the spiral groove of the shaft member accommodated is exposed, and that the rotating member includes a meshing portion that meshes with the spiral groove through the opening.

According to this configuration, since the worm and the worm wheel constitute a worm gear, the rotation axis of the spindle and the rotation axis of the shaft member can be reliably orthogonal to each other. With this configuration, the motor can be reliably disposed such that the spindle is along the rotation axis of the rotating member.

Moreover, the spiral groove of the shaft member rotated by driving of the motor is exposed through the opening of the container and meshed with the meshing portion of the rotating member. With this configuration, the meshing portion can be moved along the central axis of the shaft member as the shaft member rotates, and thus the rotating member can be rotated about the rotation axis. Accordingly, the inclination of the projection optical device supported by the rotating member can be reliably adjusted.

In the first aspect, it is preferable that the transmission device includes a biasing member that biases the meshing portion along the shaft member to maintain a meshing state of the meshing portion and the spiral groove.

According to this configuration, a gap can be prevented from being generated between the spiral groove and the meshing portion by the biasing force of the biasing member. Accordingly, the occurrence of rattling when the shaft member is rotated to rotate the rotating member can be suppressed, and the projection optical device can be stably inclined.

In the first aspect, it is preferable that the rotation axis is set within the range of an effective diameter of the projection optical device in a third direction orthogonal to each of the first direction and the second direction.

In order for the projection optical device to properly project the light modulated by the light modulating device, the light modulating device is required to be located at the back focus position of the projection optical device. However, for example if the rotation axis of the rotating member is not set within the range of the effective diameter of the projection optical device, the projection optical device moves greatly to the light-incident side or the light-exiting side when the rotating member rotates. In such a case, there is a risk that the light modulating device may not be located within the allowable range of the back focus position of the projection optical device.

In contrast to this, according to the configuration described above, the projection optical device can be prevented from greatly moving to the light-incident side or the light-exiting side when the rotating member rotates. Accordingly, the light modulating device can be reliably located within the allowable range of the back focus position of the projection optical device, and the light modulated by the light modulating device can be projected reliably and properly.

In the first aspect, it is preferable that the rotation axis is orthogonal to the central axis of the projection optical device.

According to this configuration, when the projection optical device is rotated about the rotation axis, the moving amounts of both ends of the projection optical device in the third direction to the light-incident side or the light-exiting side can be reliably reduced. Accordingly, the light modulating device can be reliably located within the allowable range of the back focus position of the projection optical device, and the light modulated by the light modulating device can be projected reliably and properly.

A projector according to a second aspect of the invention includes: a light source device; a light modulating device that modulates light emitted from the light source device; a projection optical device that projects modulated light modulated by the light modulating device and incident on the projection optical device; and an adjusting device that supports the projection optical device and adjusts the position of the projection optical device, wherein the adjusting device includes, when a direction along a central axis of the projection optical device is defined as a first direction and two directions orthogonal to the first direction and orthogonal to each other are defined as a second direction and a third direction, a first rotating member configured to rotate about a first rotation axis that is along the second direction and orthogonal to the central axis so as to be able to rotate the projection optical device, and a first moving member configured to move along one of the second direction and the third direction so as to be able to move the projection optical device.

According to this configuration, the first rotation axis of the first rotating member is along the second direction and orthogonal to the central axis of the projection optical device supported by the adjusting device. According to this configuration, even when the first rotating member is rotated to rotate the projection optical device, the movement of an end portion on the incident side of the modulated light (hereinafter referred to as "light-incident side") in the projection optical device can be reduced. For this reason, the occurrence of shift in the back focus position of the projection optical device can be prevented, and the light modulating device can be easily located within the allowable range of the back focus position of the projection optical device. Accordingly, even when the projection optical device is inclined by the first rotating member with respect to the central axis of the modulated light incident on the projection optical device, or when the projection optical device is moved by the first moving member in the one direction, the projection of the modulated light by the projection optical device after position adjustment can be properly carried out.

In the second aspect, it is preferable that one member of the first rotating member and the first moving member supports the other member.

According to this configuration, the first rotating member and the first moving member can be integrated together. Accordingly, compared to the case where the first rotating member and the first moving member are respectively supported on one surface and the other surface of the support member, the configuration of the adjusting device can be simplified and miniaturized.

In the second aspect, it is preferable that the first moving member supports the first rotating member, and that the first moving member is located on an incident side of the modulated light incident on the projection optical device with respect to the first rotating member.

In the case where the first rotating member rotatable about the first rotation axis movably supports the first moving member in the third direction orthogonal to the first rotation axis, the moving amount of the first moving member, as the adjusting device is viewed along the first direction, varies depending on the rotation amount (rotation angle) of the first rotating member when the first rotating member is rotated.

In contrast to this, according to the configuration described above, the first moving member rotatably supports the first rotating member. For this reason, even when the first moving member is moved in the state where the first rotating member is rotated, the first moving member is moved by the moving amount in the moving direction as viewed along the first direction. According to this configuration, the moving amount of the first moving member and the rotation amount of the first rotating member can be controlled independently of each other. Accordingly, the position adjustment of the projection optical device to a desired position can be easily carried out.

Moreover, the first moving member supporting the first rotating member is located on the light-incident side with respect to the first rotating member. Therefore, in the case where the first rotating member, or a configuration provided on the first rotating member, supports the projection optical device, the back focus position can be prevented from being shifted along the first direction even when the first moving member is moved. Accordingly, the projection of the modulated light by the projection optical device after position adjustment can be properly carried out.

In the second aspect, it is preferable that the projector further includes: a second rotating member configured to rotate about a second rotation axis that is along the third direction and orthogonal to the central axis so as to be able to rotate the projection optical device; and a second moving member configured to move along the other of the second direction and the third direction so as to be able to move the projection optical device.

According to this configuration, the adjustment axis of the projection optical device can be increased. Accordingly, the projection optical device can be disposed at a more proper position.

In the second aspect, it is preferable that the second moving member, the first moving member, the first rotating member, and the second rotating member are disposed in order from an incident side of the modulated light incident on the projection optical device and passing through the projection optical device.

When the first rotating member and the second rotating member, which rotate the projection optical device about the first rotation axis and the second rotation axis, are located on the light-incident side with respect to the first moving member and the second moving member, there is a possibility that the back focus position of the projection optical device may be shifted to the light-exiting side as described above.

In contrast to this, since the first moving member and the second moving member are disposed on the light-incident side of the first rotating member and the second rotating member, the back focus position can be prevented from being shifted to the light-exiting side. Accordingly, the projection of the modulated light by the projection optical device after position adjustment can be properly carried out.

In the second aspect, it is preferable that, among the first rotating member, the second rotating member, the first moving member, and the second moving member, a member that is located closest to an exiting side in a traveling direction of the modulated light incident on the projection optical device and passing through the projection optical device includes a locking member that locks the projection optical device.

Since the projection optical device projects modulated light (image) onto a projection surface, a lens on the light-exiting side is generally exposed to the outside of an external housing. On the other hand, optical components such as light modulating devices that form images are generally disposed densely on the light-incident side with respect to the projection optical device. For this reason, when the projection optical device is to be replaced, the projection optical device is considered to be pulled out of the external housing toward the light-exiting side.

However, when a locking member that locks the projection optical device is provided on a member located on the light-incident side, pulling out of the projection optical device to the light-exiting side is likely to be complicated and thus replacement work of the projection optical device is likely to be complicated.

In contrast to this, according to the configuration described above, the projection optical device can be easily pulled out from the adjusting device to the light-exiting side. Accordingly, replacement work of the projection optical device can be simplified.

In the second aspect, it is preferable that the projector further includes: a first drive device that rotates the first rotating member; a second drive device that rotates the second rotating member; a third drive device that moves the first moving member; and a fourth drive device that moves the second moving member, that the adjusting device is formed in a substantially quadrilateral shape including four side edges as viewed along the first direction, and that the first drive device, the second drive device, the third drive device, and the fourth drive device are respectively disposed according to different side edges in the four side edges.

According to this configuration, components that rotate or move the rotating members and the moving members in the drive devices can be prevented from interfering with each other. Therefore, the rotation of each of the first rotating member and the second rotating member and the movement of each of the first moving member and the second moving member can be reliably carried out, and the position adjustment of the projection optical device can be carried out properly and reliably.

In addition, since the drive devices can be disposed in a balanced manner in the adjusting device, the miniaturization of the adjusting device including the two rotating members and the two moving members can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described based on the drawings.

Schematic Configuration of Projector

Figure 1:
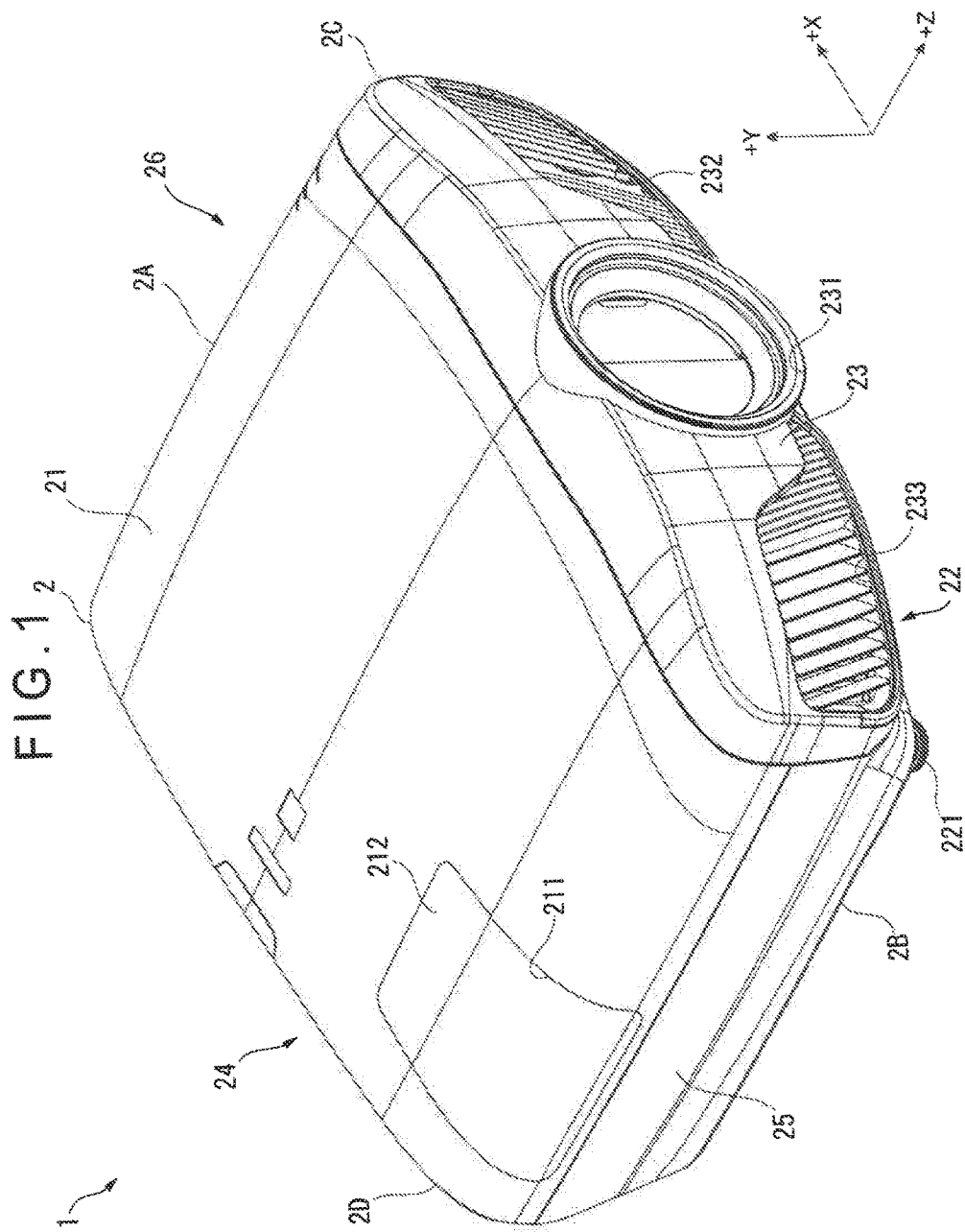
FIG. 1 is a perspective view showing an external appearance of a projector according to an embodiment of the invention.

FIG. 1 is a perspective view showing an external appearance of a projector 1 according to the embodiment.

The projector 1 according to the embodiment is an image display device that modulates light emitted from a light source device 41 (see FIG. 2) provided inside the image display device to form an image in response to image information and enlarges and projects the image onto a projection surface such as a screen. As shown in FIG. 1, the projector 1 includes an external housing 2 constituting the exterior thereof and a device main body 3 (see FIG. 2) accommodated in the external housing 2.

Although described in detail later, the projector 1 includes an adjusting device 5 that can adjust the position of a projection optical device 46 to be described later to adjust the projection position of an image by the projection optical device 46. The adjusting device 5 is configured so as to be able to move the projection optical device 46 along two orthogonal axes with respect to the central axis of the projection optical device 46. In addition, one of the features of the adjusting device 5 is that the adjusting device 5 is configured so as to be able to rotate the projection optical device 46 about each of two rotation axes along the two orthogonal axes.

Hereinafter, each configuration of the projector 1 will be described.

Configuration of External Housing

The external housing 2 includes an upper case 2A constituting the upper portion of the external housing 2, a lower case 2B constituting the lower portion, a front case 2C constituting the front surface portion, and a rear case 2D constituting the rear surface portion. With these cases combined together, the external housing 2 is formed in a substantially rectangular parallelepiped shape as a whole. The external housing 2 includes a top surface portion 21, a bottom surface portion 22, a front surface portion 23, a rear surface portion 24, a left side surface portion 25, and a right side surface portion 26.

An opening 211 through which the light source device 41 to be described later is inserted and pulled out is formed at a position on the rear surface portion 24 side and the left side surface portion 25 side in the top surface portion 21. The opening 211 is closed by a lamp cover 212 slidably provided on the left side surface portion 25 side.

Leg portions 221 (only one leg portion 221 is shown in FIG. 1) abutting against the installation surface are provided on the bottom surface portion 22.

An opening 231 through which an image projected by the projection optical device 46 to be described later passes is formed in substantially the center of the front surface portion 23. An inlet port 232 is formed at a portion on the right side surface portion 26 side in the front surface portion 23, and an exhaust port 233 is formed at a portion on the left side surface portion 25 side.

Configuration of Device Main Body

Figure 2:
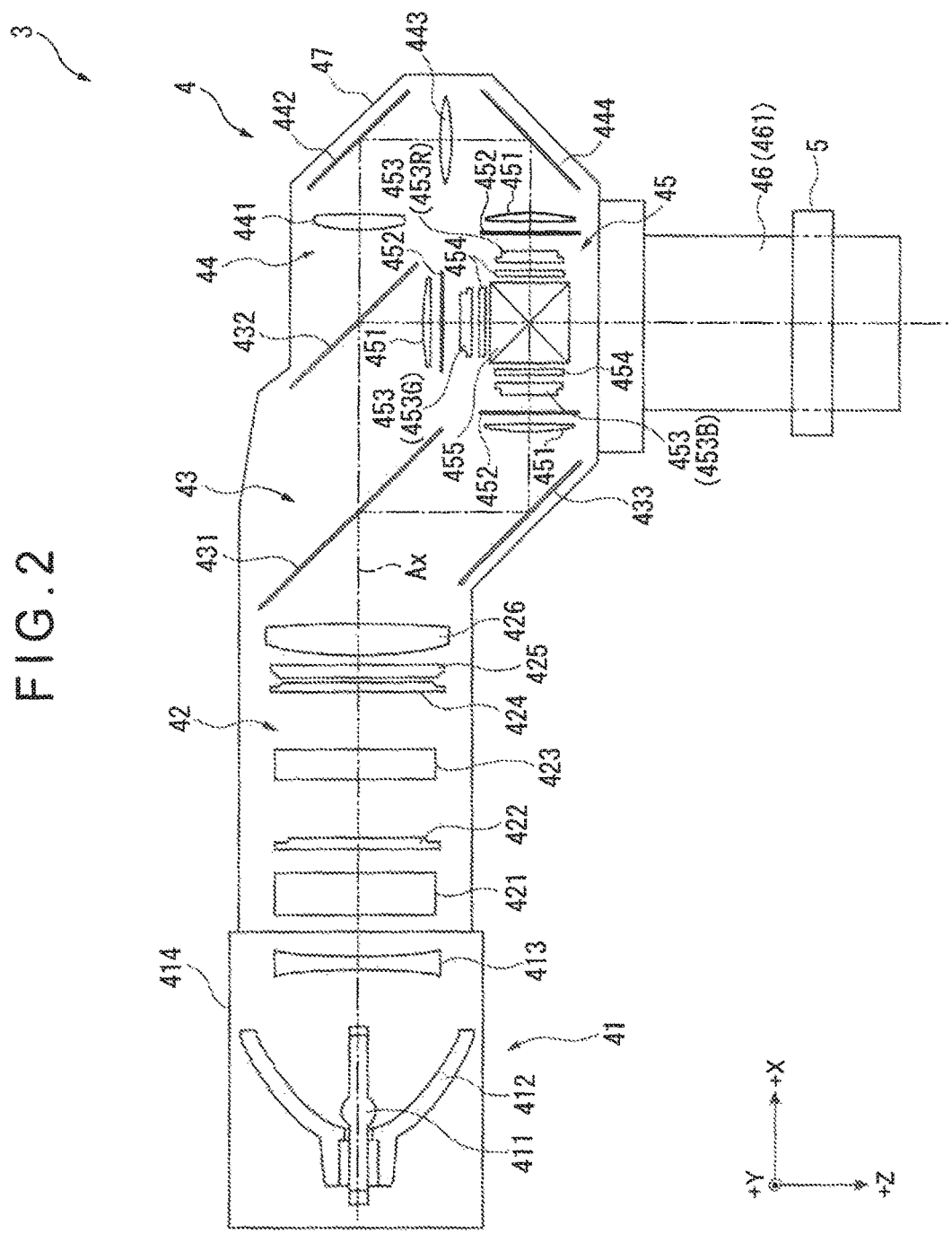
FIG. 2 is a schematic view showing the configuration of an image forming device in the embodiment.

FIG. 2 is a schematic view showing the configuration of an image forming device 4 included in the device main body 3.

The device main body 3 constitutes a main body of the projector 1. The device main body 3 includes the image forming device 4 shown in FIG. 2. In addition, although not shown in the drawing, the device main body 3 includes a control device that controls the operation of the projector 1, a power source device that supplies power to electronic components constituting the projector 1, and a cooling device that cools objects to be cooled in the configuration of the projector 1.

Configuration of Image Forming Device

Under the control of the control device, the image forming device 4 forms and projects an image in response to image information. The image forming device 4 includes the light source device 41, an illumination optical device 42, a color separating device 43, a relay device 44, an electro-optic device 45, the projection optical device 46, an optical component housing 47, and the adjusting device 5. With these components combined together, the image forming device 4 is configured as an optical unit having a substantially L-shape along the rear surface portion 24 and the right side surface portion 26 (for both see FIG. 1).

The light source device 41 emits light in the +X direction toward the illumination optical device 42. The light source device 41 includes an arc tube 411, a main reflection mirror 412, a collimating lens 413, and a container 414.

The illumination optical device 42 homogenizes the illuminance in the plane orthogonal to the central axis of luminous flux emitted from the light source device 41. The illumination optical device 42 includes, in incident order of the luminous flux from the light source device 41, a cinema filter 421, a first lens array 422, a dimming device 423, a second lens array 424, a polarization conversion element 425, and a superimposing lens 426.

The color separating device 43 separates the luminous flux incident from the illumination optical device 42 into three color lights of red (R), green (G), and blue (B). The color separating device 43 includes dichroic mirrors 431 and 432 and a reflection mirror 433.

The relay device 44 is provided on the optical path of the red light having a long optical path compared to the other color lights, in the separated three color lights. The relay device 44 includes an incident-side lens 441, a relay lens 443, and reflection mirrors 442 and 444.

The electro-optic device 45 modulates each of the separated color lights in response to image information and then combines the color lights. The electro-optic device 45 includes field lenses 451, incident-side polarizers 452, liquid crystal panels 453 (liquid crystal panels for red, green, and blue are respectively referred to as 453R, 453G, and 453B) as light modulating devices, and exiting-side polarizers 454, all of which are provided for the respective color lights, and includes a cross dichroic prism 455 as a color combining device that combines the modulated color lights (modulated lights) to form a projection image.

The projection optical device 46 enlarges and projects the projection image (the modulated light modulated by the liquid crystal panel 453) incident thereon to display the projection image on the projection surface. The projection optical device 46 is configured as a coupling lens including a plurality of lenses (not shown) and a lens barrel 461 that accommodates the plurality of lenses therein.

Although not shown in detail, the optical component housing 47 includes a component accommodating member inside which the optical components described above are disposed and a lid-like member combined with the component accommodating member.

An illumination optical axis Ax as a design optical axis is set in the optical component housing 47. The devices 41 to 46 are disposed at predetermined positions on the illumination optical axis Ax. The light source device 41 is disposed such that the illumination optical axis Ax coincides with the central axis of the light emitted from the light source device 41.

Configuration of Adjusting Device

Figure 3:
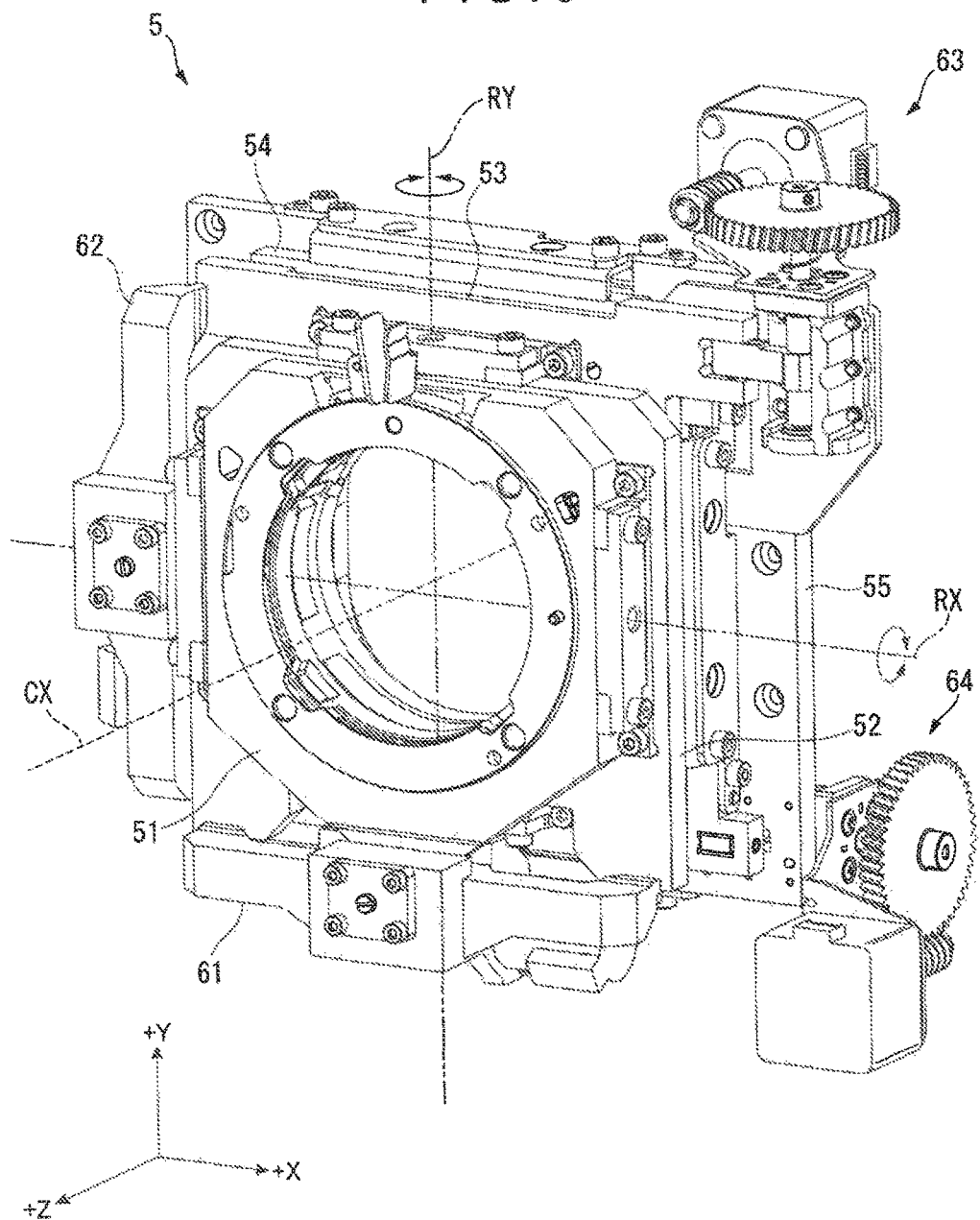
FIG. 3 is a perspective view of an adjusting device in the embodiment as viewed from the light-exiting side.
Figure 4:
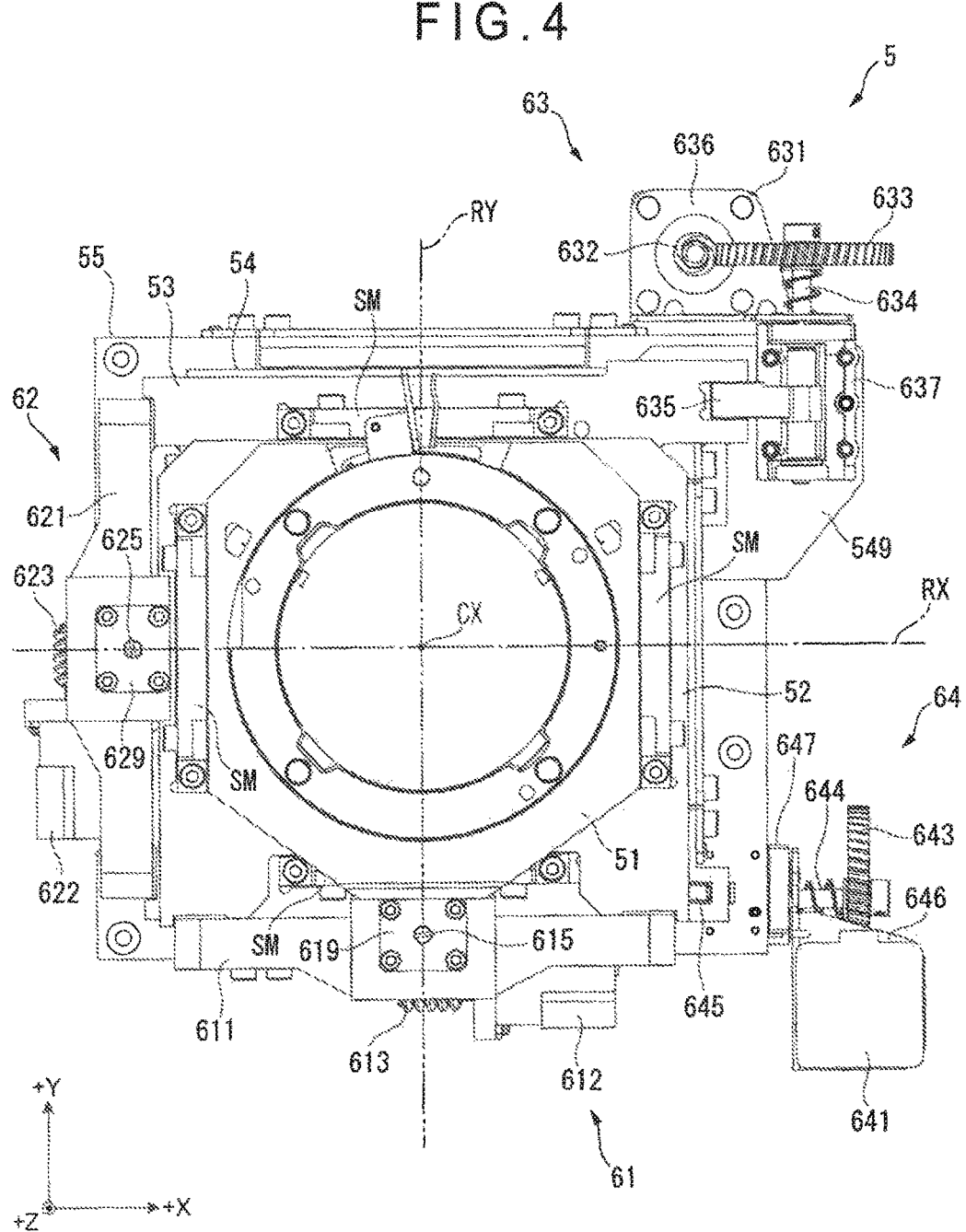
FIG. 4 is a diagram of the adjusting device in the embodiment as viewed from the light-exiting side.
Figure 5:
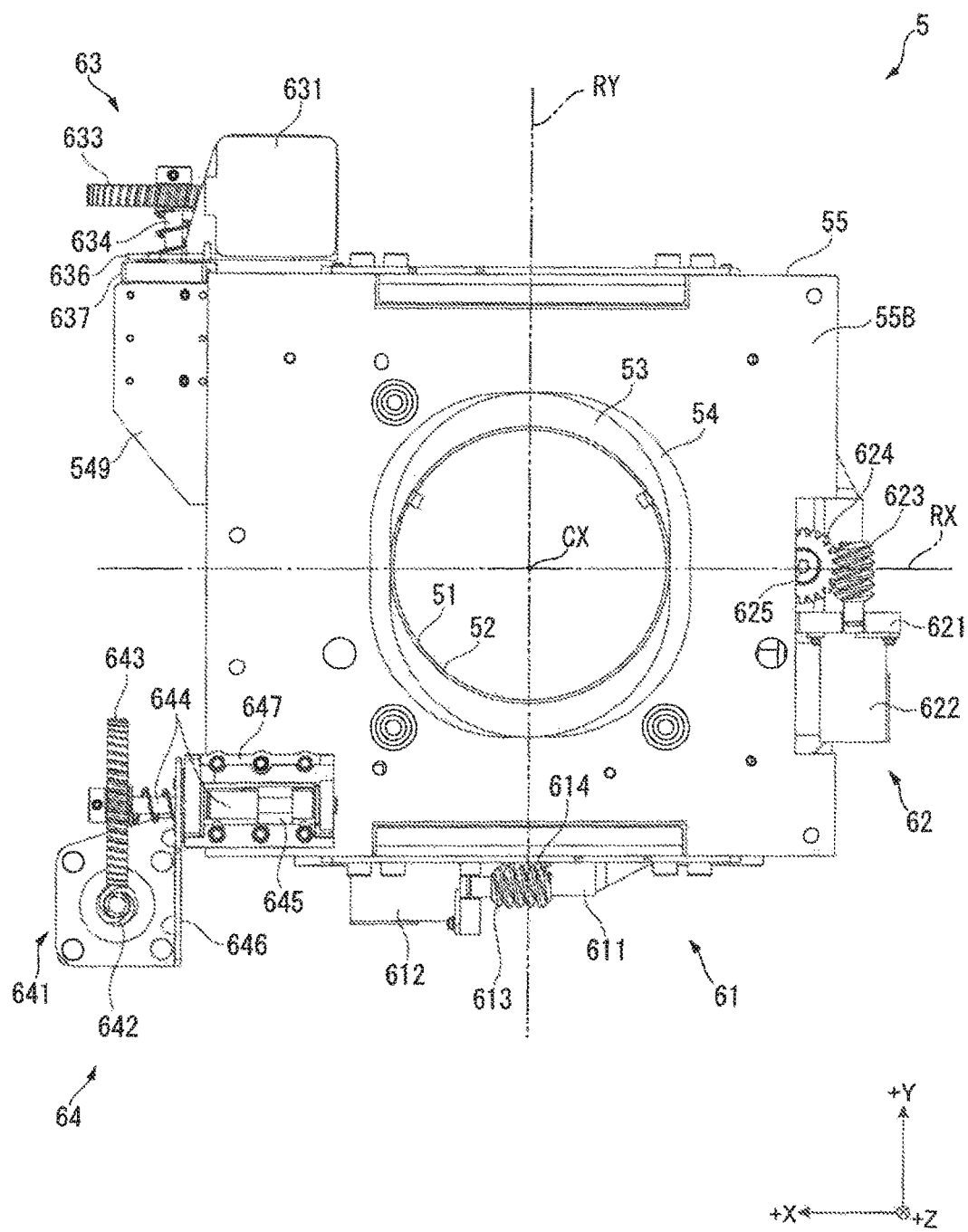
FIG. 5 is a diagram of the adjusting device in the embodiment as viewed from the light-incident side.
Figure 6:
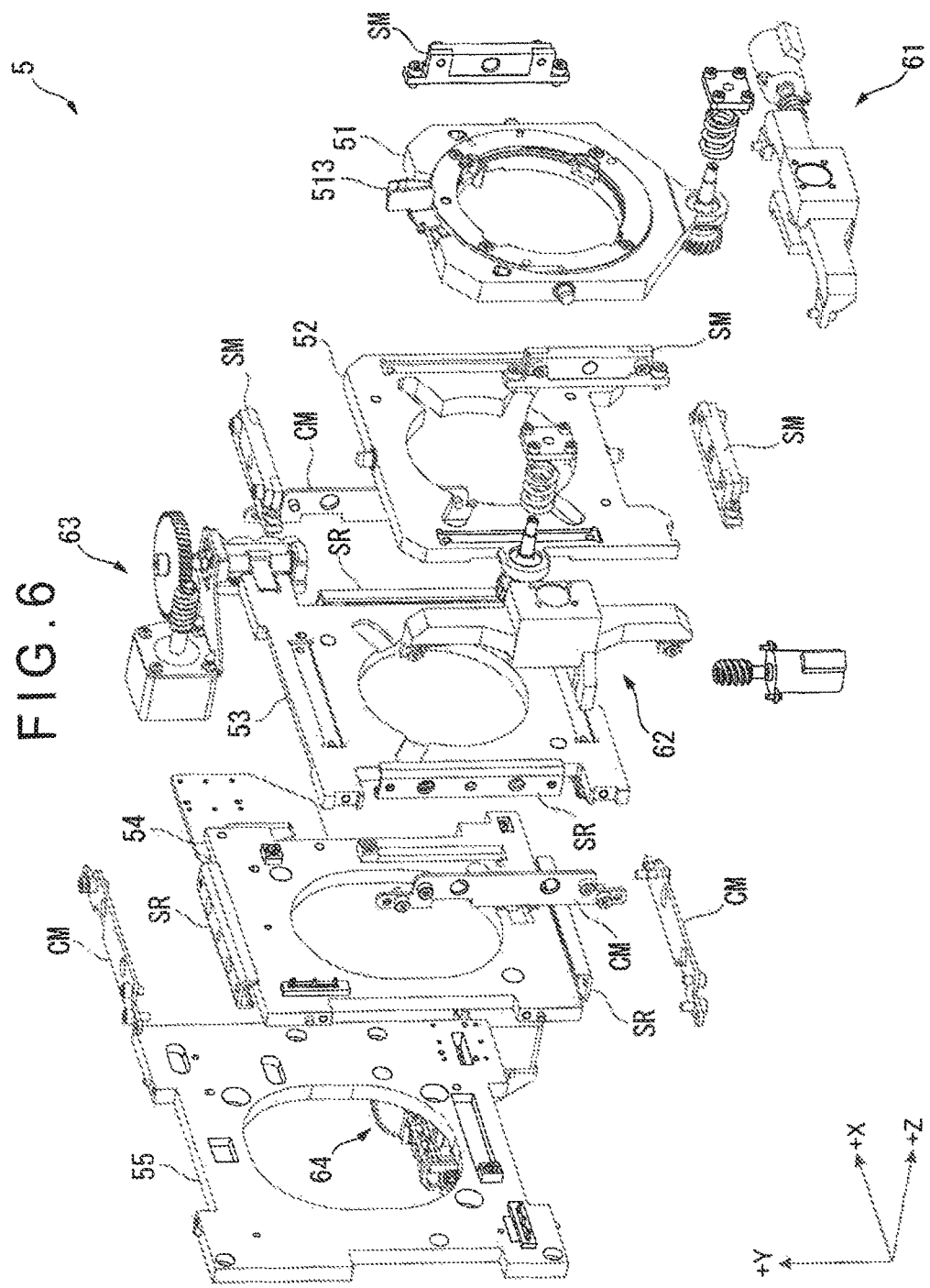
FIG. 6 is an exploded perspective view showing the adjusting device in the embodiment.

FIG. 3 is a perspective view of the adjusting device 5 as viewed from the light-exiting side. FIGS. 4 and 5 are diagrams of the adjusting device 5 as viewed from the light-exiting side and the light-incident side, respectively. Further, FIG. 6 is an exploded perspective view of the adjusting device 5 as viewed from the light-exiting side. Rotation axes RX and RY are shifted in the +Z direction to be described later, and therefore do not appear to cross the central axis CX of the projection optical device 46 in FIG. 3, which is a perspective view. However, the rotation axes RX and RY are orthogonal to the central axis CX when viewed from the +Z direction side as shown in FIGS. 4 and 5.

The adjusting device 5 is fixed to the inner surface (specifically the inner surface of the bottom surface portion 22) of the external housing 2. The adjusting device 5 supports the lens barrel 461 (see FIG. 2) of the projection optical device 46, and moves the lens barrel 461 to adjust the projection position of an image by the projection optical device 46. Specifically, the adjusting device 5 has the function of rotating the projection optical device 46 about the two rotation axes RX and RY, which are respectively along a second direction (coincident with one of the +X direction and the +Y direction to be described later) and a third direction (coincident with the other of the +X direction and the +Y direction to be described later) that are orthogonal to a first direction (coincident with the +Z direction to be described later) along the central axis of the projection optical device 46, and adjusting the inclination of the projection optical device 46 with respect to the modulated light modulated by the liquid crystal panel 453 as a light modulating device and incident on the projection optical device 46.

As shown in FIGS. 3 to 6, the adjusting device 5 includes a first rotating member 51, a second rotating member 52, a first moving member 53, a second moving member 54, a support member 55, which support the lens barrel 461, and includes a first drive device 61, a second drive device 62, a third drive device 63, and a fourth drive device 64. The support member 55, the second moving member 54, the first moving member 53, the second rotating member 52, and the first rotating member 51 are disposed in this order from the incident side toward the exiting side of light passing through the projection optical device 46.

In the following description, the traveling direction of the modulated light passing through the projection optical device 46 along the illumination optical axis Ax is defined as the +Z direction. The +Z direction is a direction that is along the central axis CX of the projection optical device 46. In two directions orthogonal to the +Z direction and orthogonal to each other, a direction from the bottom surface portion 22 side toward the top surface portion 21 side is defined as the +Y direction, while a direction from the left side surface portion 25 side toward the right side surface portion 26 side is defined as the +X direction. A direction opposite to the +Z direction is defined as the −Z direction. The same applies to the −X direction and the −Y direction. That is, in a certain configuration, the light-incident side is the −Z direction side, while the light-exiting side is the +Z direction side.

Configuration of First Rotating Member

Figure 7:
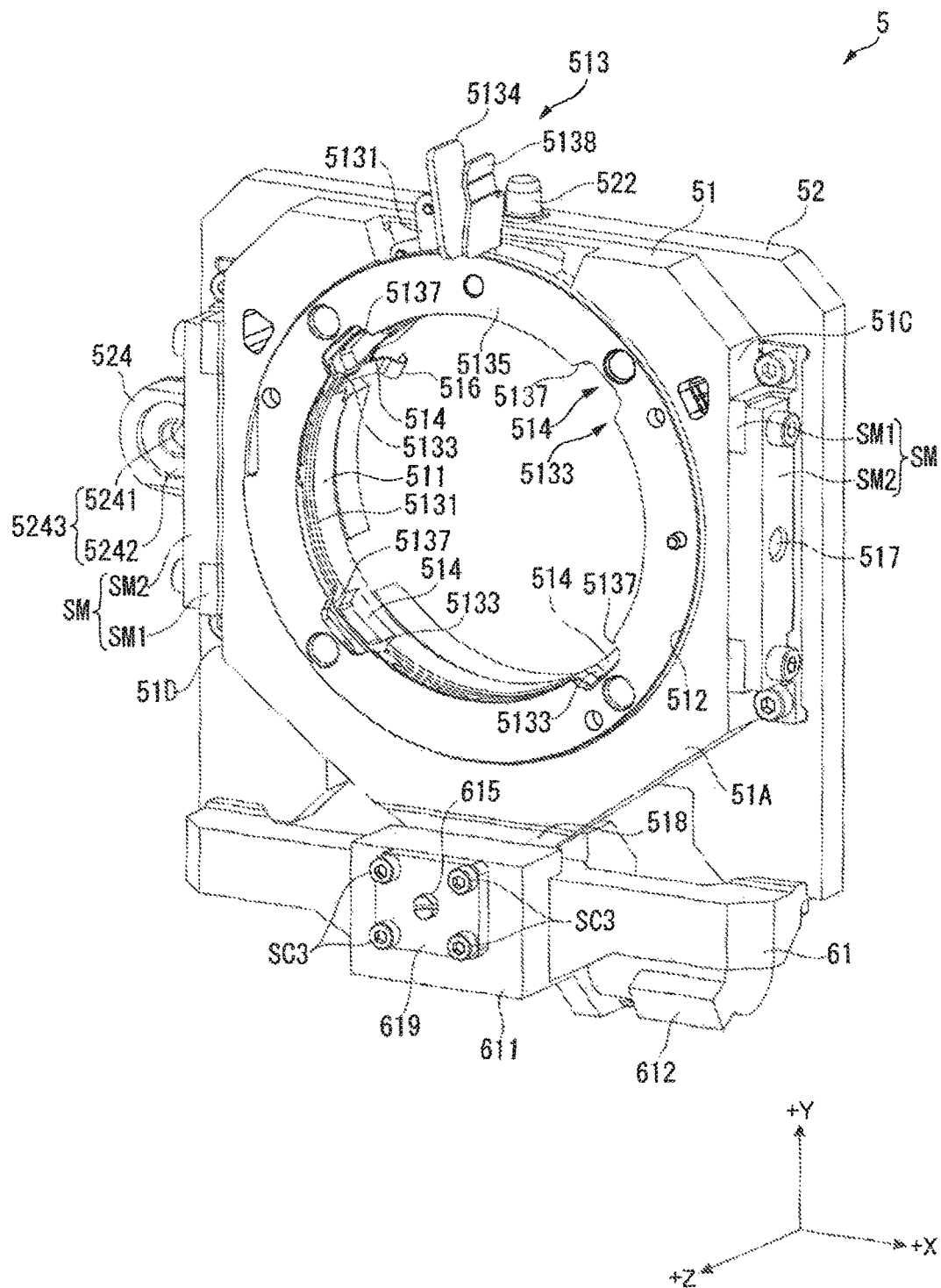
FIG. 7 is a perspective view showing a first rotating member supported by a second rotating member in the embodiment.
Figure 8:
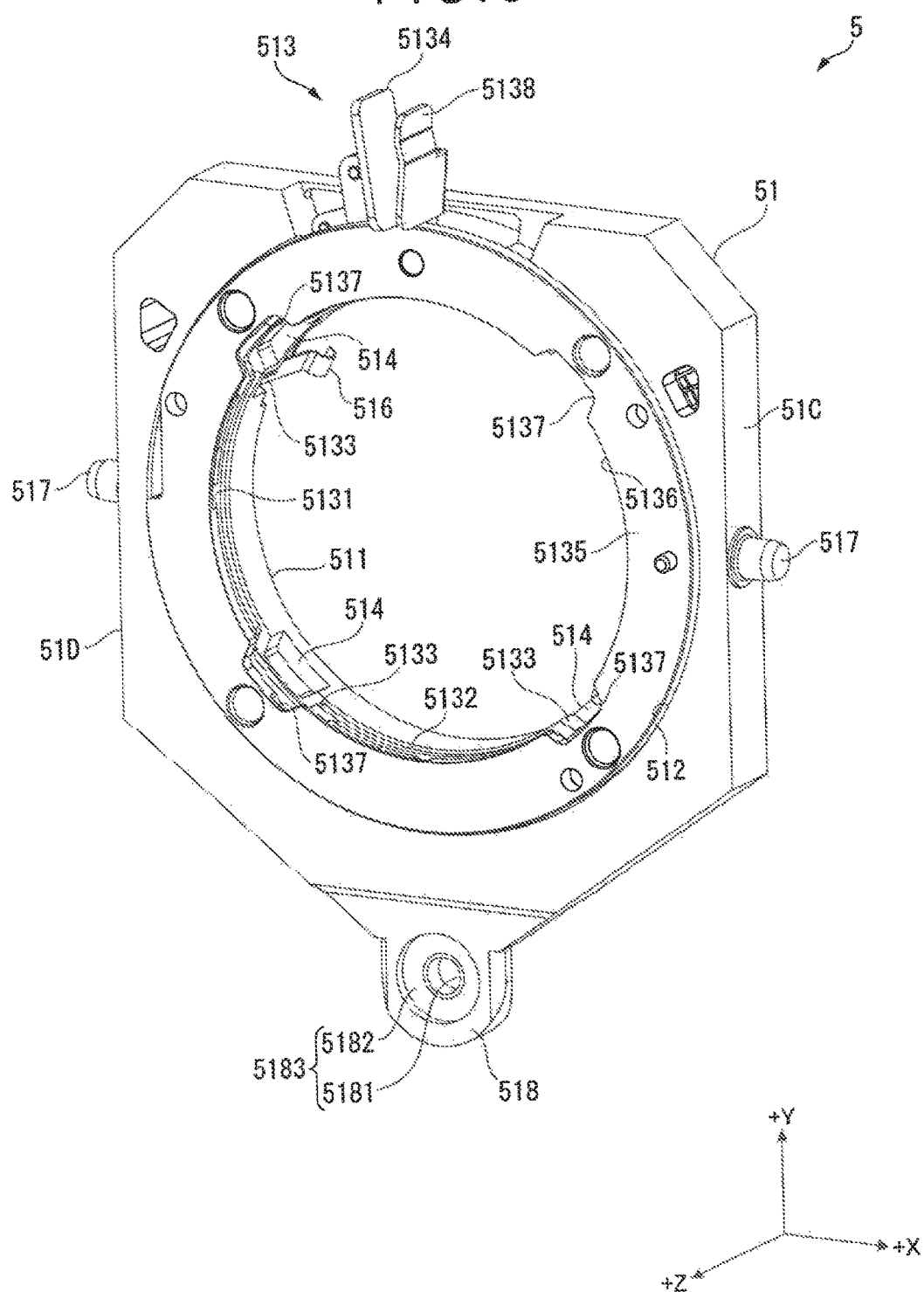
FIG. 8 is a perspective view of the first rotating member in the embodiment as viewed from the light-exiting side.

FIG. 7 is a perspective view of the first rotating member 51 supported by the second rotating member 52, as viewed from the light-exiting side. FIG. 8 is a perspective view of the first rotating member 51 as viewed from the light-exiting side.

The first rotating member 51 supports the lens barrel 461 while being supported by the second rotating member 52. The first rotating member 51 rotates about the rotation axis RX (see FIGS. 3 to 5) orthogonal to the central axis CX of the projection optical device 46 along the +X direction to be inclined with respect to the XY plane, thereby inclining the projection optical device 46 with respect to the XY plane to adjust the inclination of the projection optical device 46 with respect to the illumination optical axis Ax. As shown in FIGS. 7 and 8, the first rotating member 51 is formed in a substantially pentagonal shape that is line symmetrical with respect to a center line along the +Y direction orthogonal to the central axis CX.

A circular opening 511 through which the lens barrel 461 is inserted is formed in the center of the first rotating member 51.

An accommodating recess 512 concentric with the opening 511 is formed around the opening 511 so as to be recessed on the −Z direction side in an end surface 51A on the light-exiting side (the +Z direction side) in the first rotating member 51. A locking member 513 that locks the lens barrel 461 is fixed to the accommodating recess 512 with a screw.

The locking member 513 includes an annular rotating member 5131 that is rotatable along the edge of the opening 511 about the +Z direction, an annular interposing member 5135 that interposes the rotating member 5131 between the first rotating member 51 and the interposing member 5135, and a gripping member 5138.

The interposing member 5135 includes a circular opening 5136 in its center, and includes four notch portions 5137 at the inner edge of the opening 5136.

The rotating member 5131 includes an opening 5132 and four notch portions 5133 similar to the opening 5136 and the four notch portions 5137. In addition, the rotating member 5131 includes, at its end portion on the +Y direction side, a lever portion 5134 projecting to the +Y direction side.

The gripping member 5138 is attached in the vicinity of the lever portion 5134.

On the other hand, substantially trapezoidal recesses 514 recessed on the −Z direction side are formed respectively at the positions corresponding to the four notch portions 5137 in the end surface 51A. The recesses 514 are exposed when the lever portion 5134 is operated to rotate the rotating member 5131 in one direction, and projecting portions (not shown) formed on the lens barrel 461 are inserted into the recesses 514 when the lens barrel 461 is inserted into the opening 511. In this state, when the rotating member 5131 is rotated in the other direction, the projecting portions are covered by the rotating member 5131 and thereby the lens barrel 461 is locked to the first rotating member 51. Although not shown in the drawing, the locking member 513 includes a biasing member that biases the rotating member 5131 in the other direction (direction in which the lens barrel 461 is locked) and thereby the state where the lens barrel 461 is locked to the locking member 513 is maintained.

Figure 9:
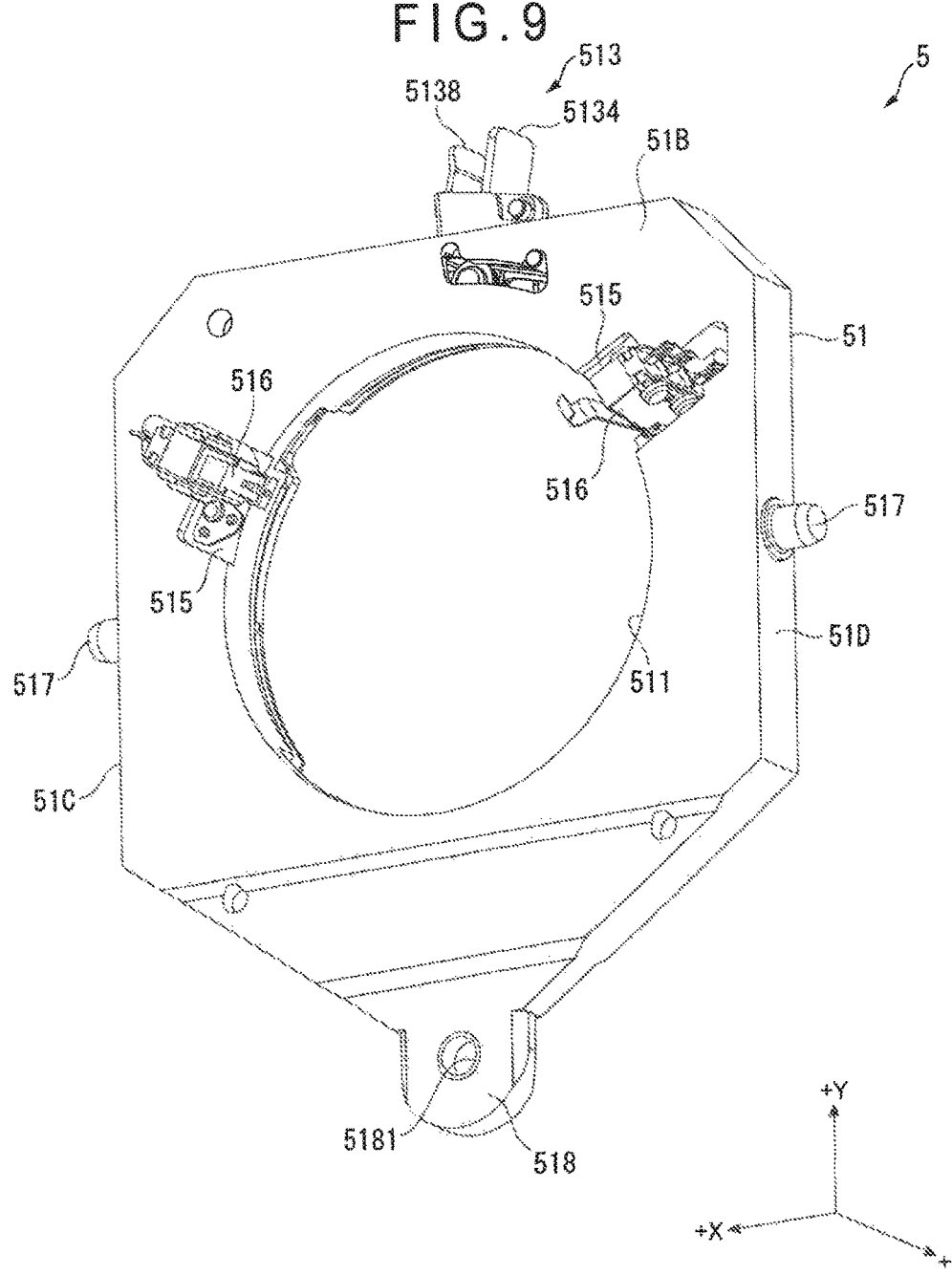
FIG. 9 is a perspective view of the first rotating member in the embodiment as viewed from the light-incident side.

FIG. 9 is a perspective view of the first rotating member 51 as viewed from the light-incident side.

As shown in FIG. 9, two recesses 515 extending radially outward of the opening 511 from the edge of the opening 511 are formed at positions symmetrical with respect to an imaginary line passing through the center of the opening 511 along the +Y direction in an end surface 51B of the first rotating member 51 on the light-incident side (the −Z direction side). Pressing members 516 that press the lens barrel 461 inserted into the opening 511 radially inward of the opening 511 are respectively provided in the recesses 515.

As shown in FIGS. 8 and 9, rotation shaft portions 517 are protruded substantially at the center of an end surface 51C on the +X direction side and the center of an end surface 51D on the −X direction side in the first rotating member 51. The rotation shaft portions 517 are portions that are inserted into support members SM provided on the second rotating member 52 and constitute the rotation axis RX of the first rotating member 51.

A portion on the −Y direction side in the first rotating member 51 has a tapered shape in which the dimension in the +X direction decreases toward the −Y direction. A substantially half-oval-shaped projecting portion 518 is formed at the tip of the portion on the −Y direction side.

The projecting portion 518 includes a circular through-hole 5181 penetrating the projecting portion 518 along the +Z direction and a concentric step portion 5182 formed around the through-hole 5181. That is, the projecting portion 518 includes a stepped hole 5183 formed by the through-hole 5181 and the step portion 5182. A shaft member 615 constituting the first drive device 61 to be described later is inserted through the through-hole 5181. A biasing member 617 similarly constituting the first drive device 61 abuts against the step portion 5182. The first drive device 61 will be described in detail later.

Configuration of Second Rotating Member

Figure 10:
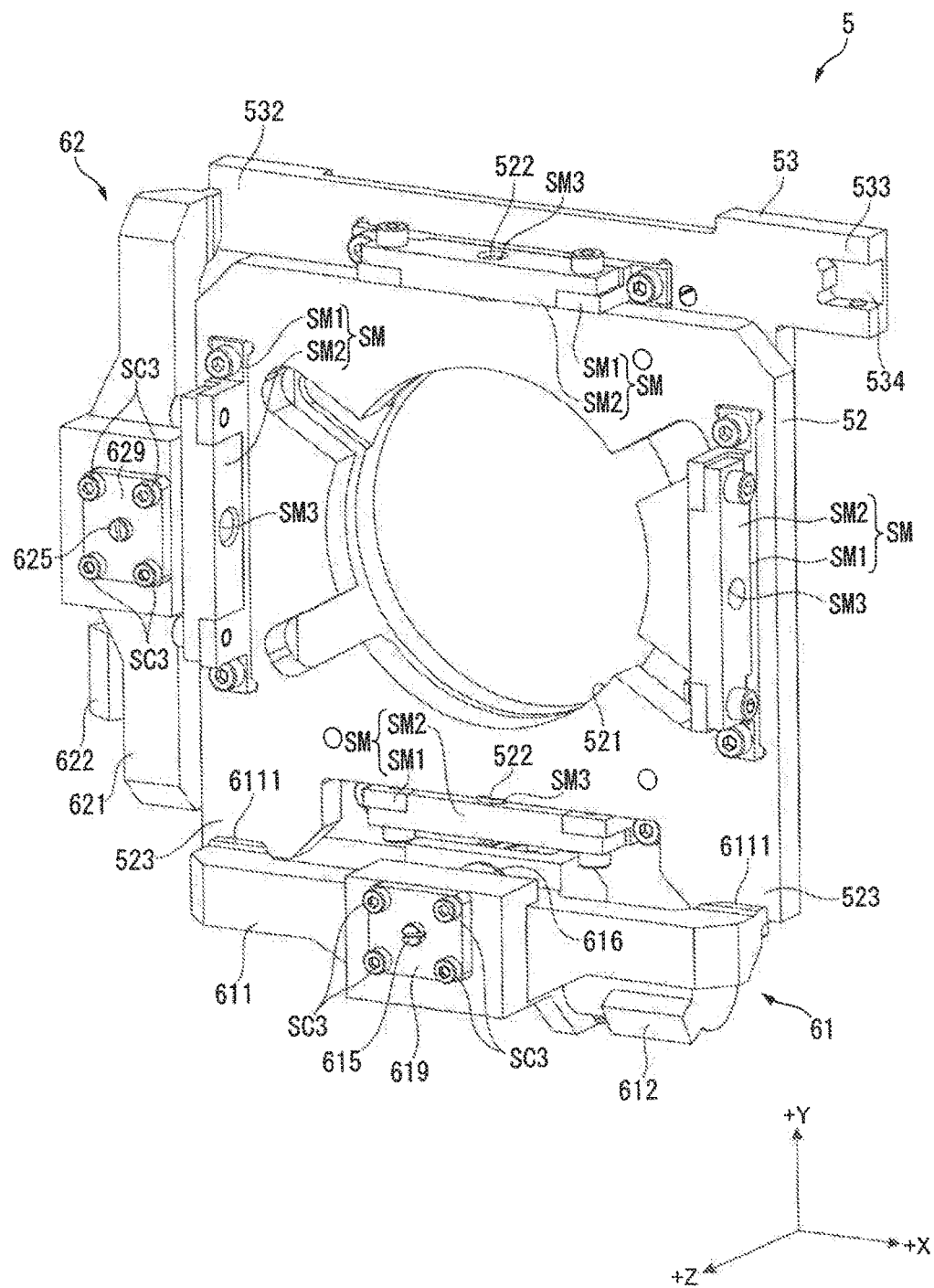
FIG. 10 is a perspective view showing the second rotating member supported by a first moving member in the embodiment.
Figure 11:
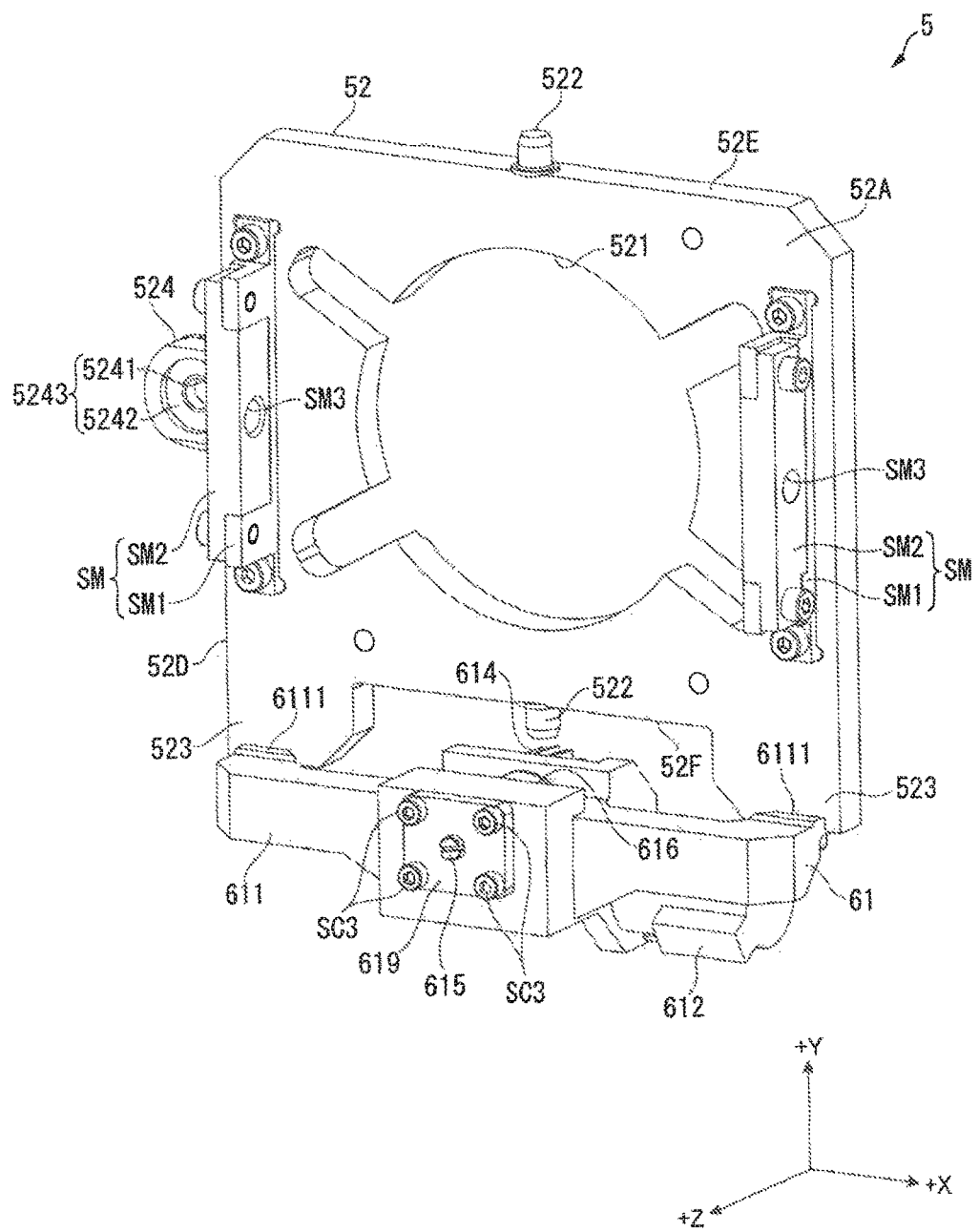
FIG. 11 is a perspective view of the second rotating member in the embodiment as viewed from the light-exiting side.
Figure 12:
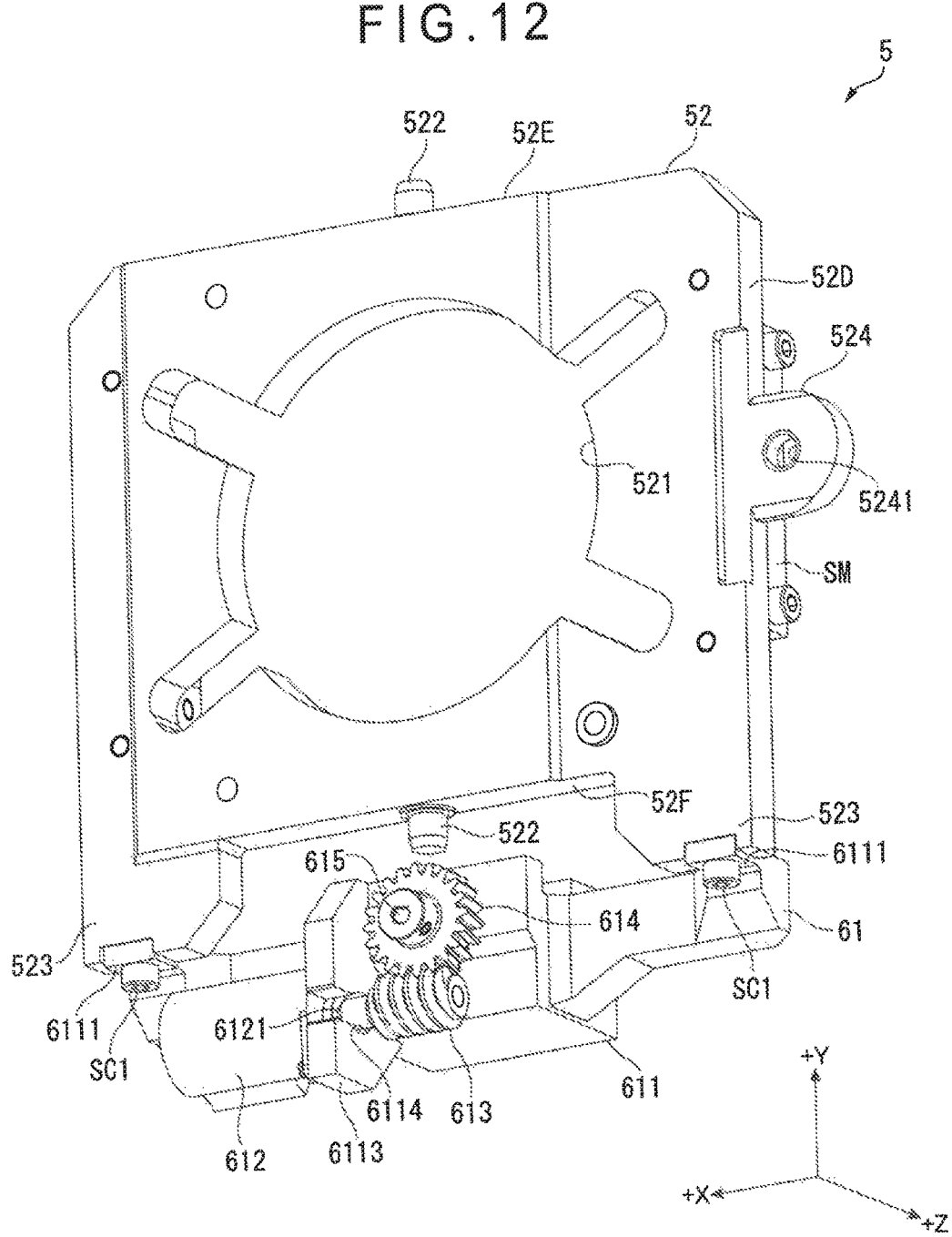
FIG. 12 is a perspective view of the second rotating member in the embodiment as viewed from the light-incident side.

FIG. 10 is a perspective view of the second rotating member 52 supported by the first moving member 53, as viewed from the light-exiting side. FIGS. 11 and 12 are perspective views of the second rotating member 52 as viewed from the light-exiting side and the light-incident side, respectively.

The second rotating member 52 rotatably supports the first rotating member 51 about the rotation axis RX and is rotatably supported by the first moving member 53. The second rotating member 52 rotates about the rotation axis RY (see FIGS. 3 to 5) orthogonal to the central axis CX along the +Y direction to be inclined with respect to the XY plane, thereby inclining the projection optical device 46 with respect to the XY plane to adjust the inclination of the projection optical device 46 with respect to the illumination optical axis Ax. The second rotating member 52 is formed in a substantially rectangular shape as shown in FIGS. 10 to 12.

An opening 521 is formed substantially in the center of the second rotating member 52. The opening 521 has a combined shape of a circle and a cross shape extending from the center of the circle to the four corners of the second rotating member 52 having a rectangular shape. The lens barrel 461 locked to the first rotating member 51 by the locking member 513 is inserted through the opening 521 along the +Z direction. The pressing members 516 (see FIG. 9) are located respectively at portions on the +Y direction side in the cross-shaped portion of the opening 521.

As shown in FIGS. 10 and 11, the two support members SM are provided so as to interpose the opening 521 from the −X direction side and the +X direction side in an end surface 52A on the light-exiting side (the +Z direction side) in the second rotating member 52.

The support members SM have the same shape and each have a configuration in which a fixed portion SM1 that is fixed to a fixation object and a support portion SM2 that supports a support object are combined with screws. The support portion SM2 includes a hole SM3 penetrating the support portion SM2 along the thickness direction. When the support member SM is fixed to the second rotating member 52, the fixation object is the end surface 52A and the support object is the first rotating member 51. When the support member SM is fixed to the first moving member 53 to be described later, the fixation object is an end surface 53A and the support object is the second rotating member 52.

In the support members SM fixed to the end surface 52A, the rotation shaft portion 517 (see FIGS. 8 and 9) protruded on the end surface 51D in the first rotating member 51 is inserted into the hole SM3 of the support member SM located on the −X direction side, while the rotation shaft portion 517 (see FIGS. 8 and 9) protruded on the end surface 51C in the first rotating member 51 is inserted into the hole SM3 of the support member SM located on the +X direction side. With this configuration, the first rotating member 51 is rotatably supported with respect to the second rotating member 52.

Rotation shaft portions 522 are respectively protruded at the center of an end surface 52E on the +Y direction side and the center of an end surface 52F on the −Y direction side in the second rotating member 52. The rotation shaft portions 522 are portions that are supported by the first moving member 53 and constitute the rotation axis RY of the second rotating member 52.

Projecting portions 523 projecting to the −Y direction side are respectively formed at end portions on the +X direction side and the −X direction side in the end surface 52F. The first drive device 61 rotating the first rotating member 51 is attached to the projecting portions 523.

A projecting portion 524 projecting to the −X direction side is provided substantially at the center of an end surface 52D on the −X direction side in the second rotating member 52. The projecting portion 524 is formed in a substantially half-oval-shape, similarly to the projecting portion 518, as viewed from the +Z direction side. The projecting portion 524 includes a stepped hole 5243 formed by a circular through-hole 5241 penetrating the projecting portion 524 along the +Z direction and a concentric step portion 5242 formed around the through-hole 5241.

A shaft member 625 constituting the second drive device 62 rotating the second rotating member 52 is inserted through the through-hole 5241. A biasing member (not shown) similarly constituting the second drive device 62 abuts against the step portion 5242. The second drive device 62 will be described in detail later.

Configuration of First Moving Member

Figure 13:
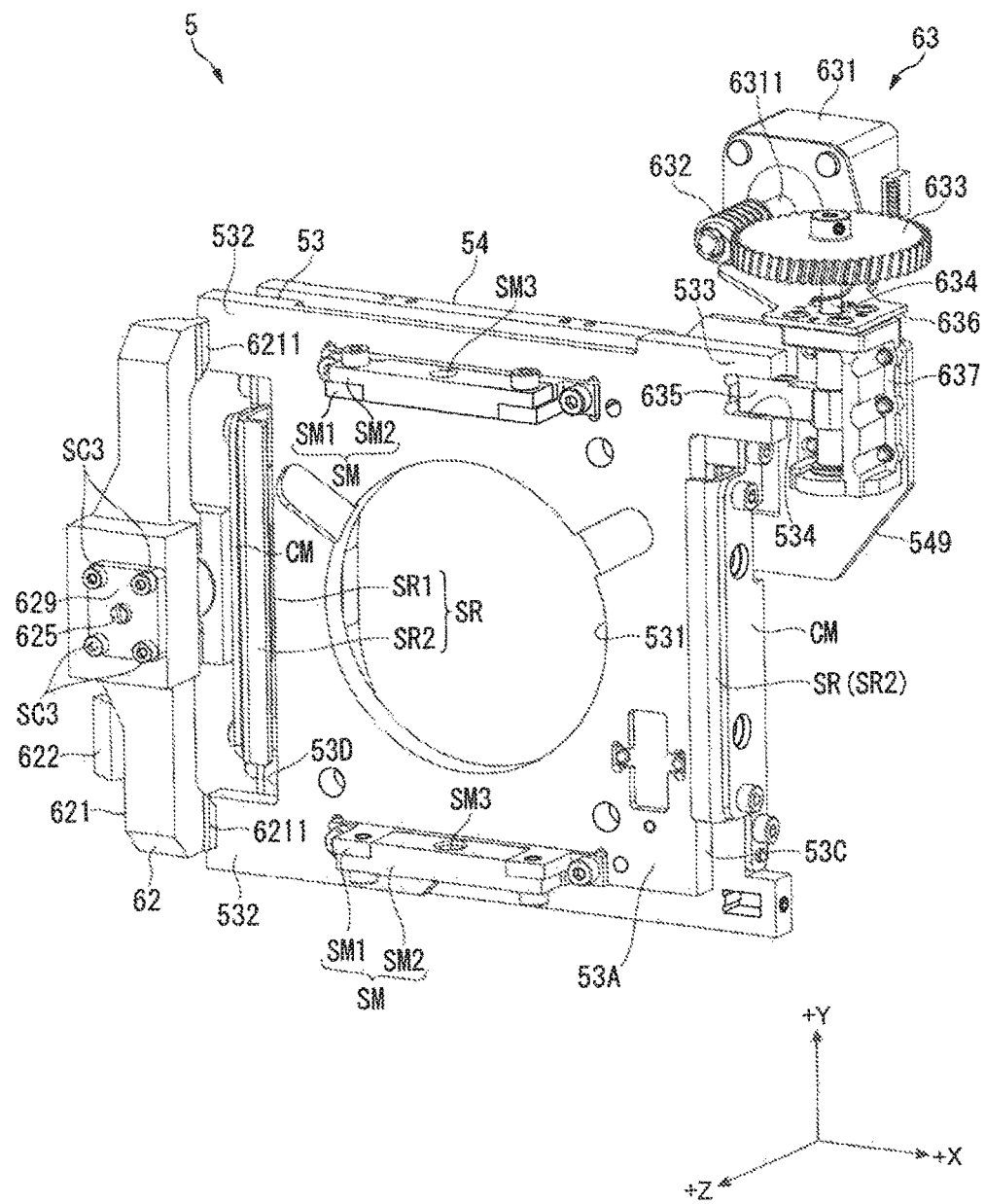
FIG. 13 is a perspective view showing the first moving member supported by a second moving member in the embodiment.
Figure 14:
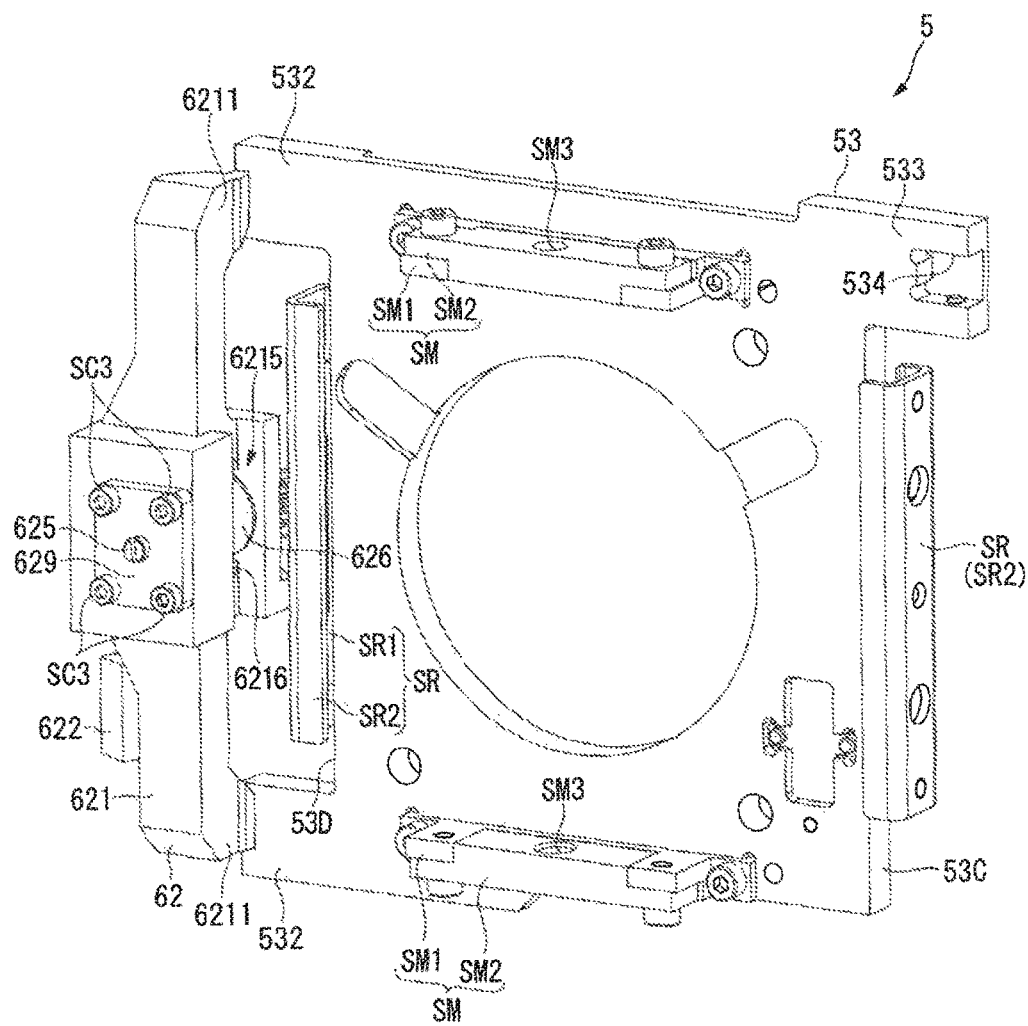
FIG. 14 is a perspective view of the first moving member in the embodiment as viewed from the light-exiting side.
Figure 15:
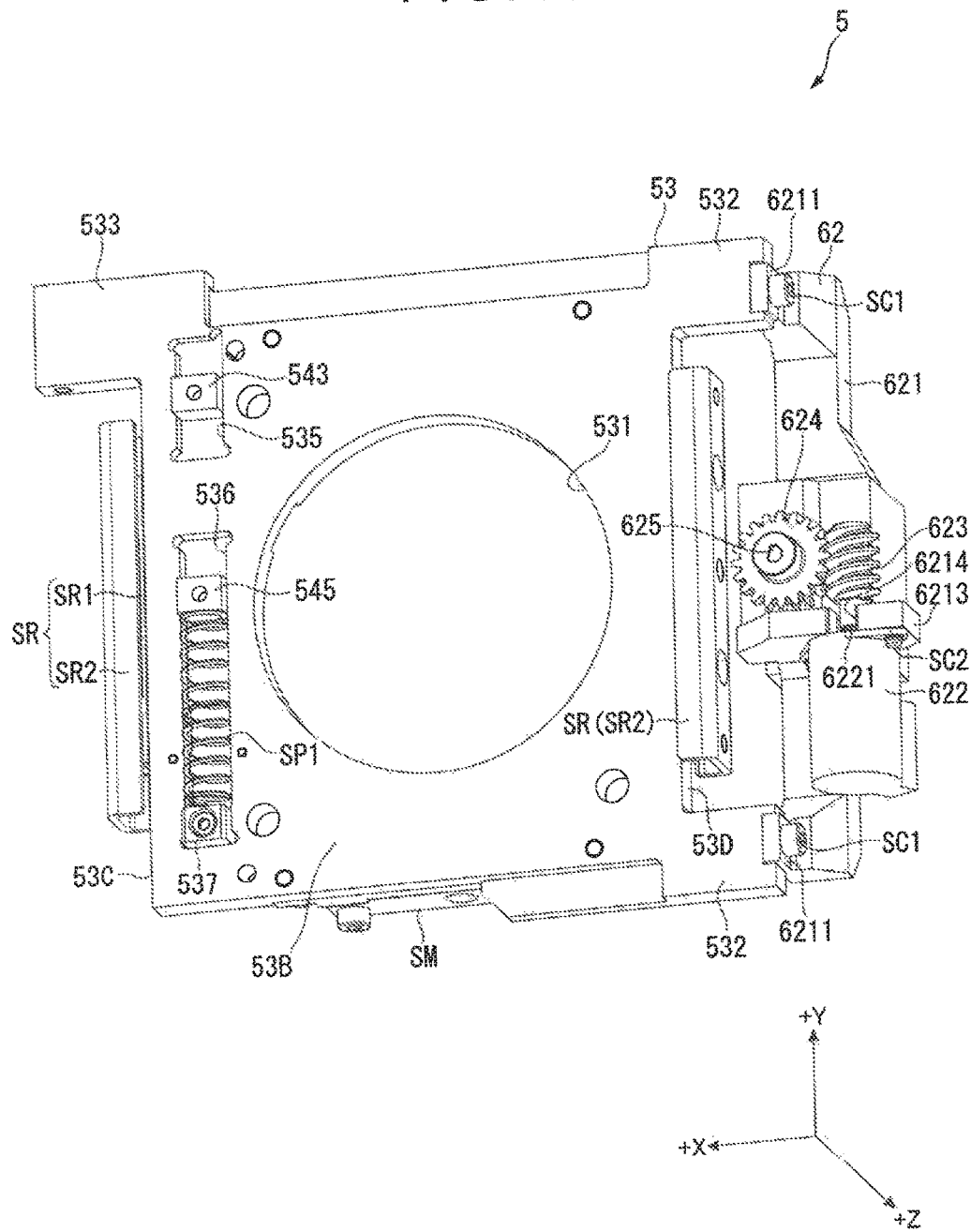
FIG. 15 is a perspective view of the first moving member in the embodiment as viewed from the light-incident side.

FIG. 13 is a perspective view of the first moving member 53 supported by the second moving member 54, as viewed from the light-exiting side. FIGS. 14 and 15 are perspective views of the first moving member 53 as viewed from the light-exiting side and the light-incident side, respectively.

The first moving member 53 is a member that rotatably supports the second rotating member 52 and is linearly movably supported by the second moving member 54. That is, the first moving member 53 is also a support member for the second rotating member 52. The first moving member 53 is moved along the +Y direction by the third drive device 63 to be described later, thereby adjusting the shift amount of the central axis of the projection optical device 46 with respect to the illumination optical axis Ax and thus the position of a projection image on the projection surface.

As shown in FIGS. 13 to 15, the first moving member 53 is formed in a substantially rectangular plate shape as viewed along the +Z direction. A circular opening 531 is formed in the center of the first moving member 53. Similarly to the above, the lens barrel 461 supported by the first rotating member 51 is inserted through the opening 531.

As shown in FIGS. 13 and 14, the two support members SM are disposed so as to interpose the opening 531 from the +Y direction side and the −Y direction side on the end surface 53A of the first moving member 53 on the light-incident side (the +Z direction side).

In the two support members SM, the rotation shaft portion 522 protruded on the end surface 52E of the second rotating member 52 is inserted into the hole SM3 of the support member SM on the +Y direction side, while the rotation shaft portion 522 protruded on the end surface 52F is inserted into the hole SM3 of the support member SM on the −Y direction side. With this configuration, the second rotating member 52 is rotatably supported with respect to the first moving member 53.

Projecting portions 532 projecting to the −X direction side are respectively formed at portions on the +Y direction side and the −Y direction side in an end surface 53D of the first moving member 53 on the −X direction side. The second drive device 62 rotating the second rotating member 52 is attached to the projecting portions 532.

On the other hand, a projecting portion 533 projecting to the +X direction side is provided at a portion on the +Y direction side in the end surface 53D on the +X direction side. A recess 534 recessed on the −Z direction side and opened to the +X direction side and the +Z direction side is formed in the projecting portion 533. A moving piece 635 of the third drive device 63 to be described later is inserted into the recess 534.

As shown in FIGS. 13 to 15, slide rails SR (specifically inner rails SR1) are attached to the centers of an end surface 53C and the end surface 53D.

The slide rail SR is configured to include the inner rail SR1 and an outer rail SR2 combined together so as to face each other along the thickness direction. The inner rail SR1 and the outer rail SR2 are configured so as to be able to linearly move relative to each other. A rolling element (not shown) such as a ball is accommodated between the rails SR1 and SR2. The slide rail SR is a raceway member configured such that, when one rail of the inner rail SR1 and the outer rail SR2 slidingly moves linearly with respect to the other rail, the rolling element rolls on the rolling element rolling surface to thereby reduce the sliding resistance of the one rail to the other rail and thus the one rail can smoothly move.

Since the dimension of the inner rail SR1 in the longitudinal direction is smaller than the dimension of the outer rail SR2 in the same direction, the inner rail SR1 can move along the longitudinal direction within the range of the dimension of the outer rail SR2 in the longitudinal direction. The inner rail SR1 is fixed to a fixation object (e.g., the first moving member 53) with a screw (not shown). The outer rail SR2 is coupled to a coupling object (e.g., the second moving member 54) with a coupling member CM as shown in FIG. 13.

As shown in FIG. 15, two recesses 535 and 536 are formed at positions on the +X direction side in an end surface 53B of the first moving member 53 on the light-incident side (the −Z direction side).

A sliding member 543 attached to the second moving member 54 is disposed in the recess 535 located on the +Y direction side. The sliding member 543 abuts against edges on the +X direction side and the −X direction side in the recess 535, and thereby linear movement along the +Y direction in the first moving member 53 becomes stable.

Similarly to the recess 535, the recess 536 located on the −Y direction side is formed in a substantially rectangular shape with its longitudinal direction along the +Y direction. The dimension of the recess 536 along the +X direction is the same as that of the recess 535, but the dimension of the recess 536 along the +Y direction is larger than that of the recess 535. A fixed member 537 is attached to an end portion on the −Y direction side in the recess 536. An end portion on the −Y direction side in a compression coil spring SP1 as a biasing member disposed similarly in the recess 536 abuts against the fixed member 537. On the other hand, an end portion on the +Y direction side in the compression coil spring SP1 abuts against a fixed member 545 fixed to the second moving member 54.

The first moving member 53 is biased by the compression coil spring SP1 to the −Y direction side with respect to the second moving member 54, and thereby, as shown in FIG.

13, a gap is prevented from being generated between the moving piece 635 of the third drive device 63 fixed to the second moving member 54 and an edge (edge on the +Y direction side) of the recess 534.

Configuration of Second Moving Member

Figure 16:
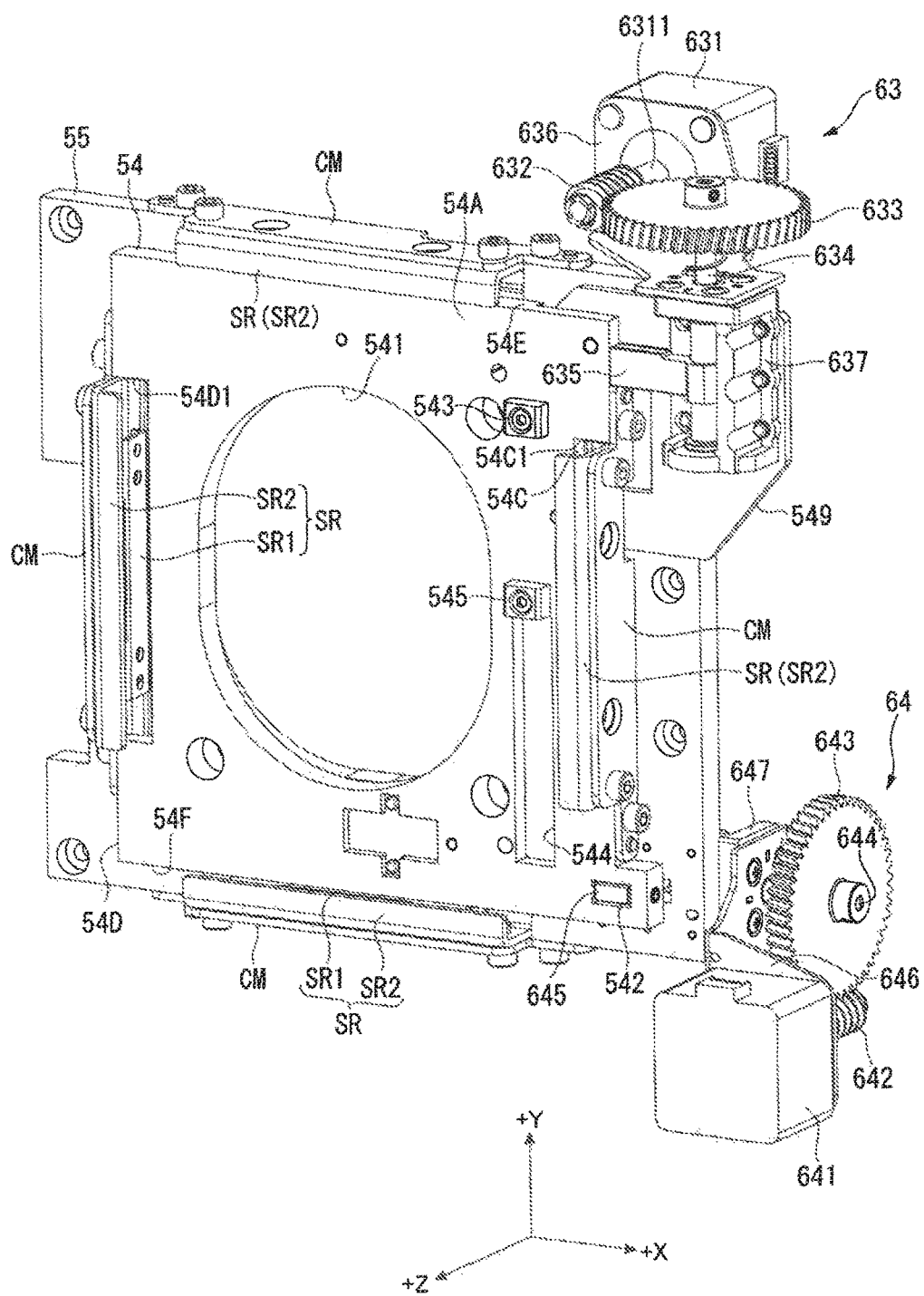
FIG. 16 is a perspective view showing the second moving member supported by a support member in the embodiment.
Figure 17:
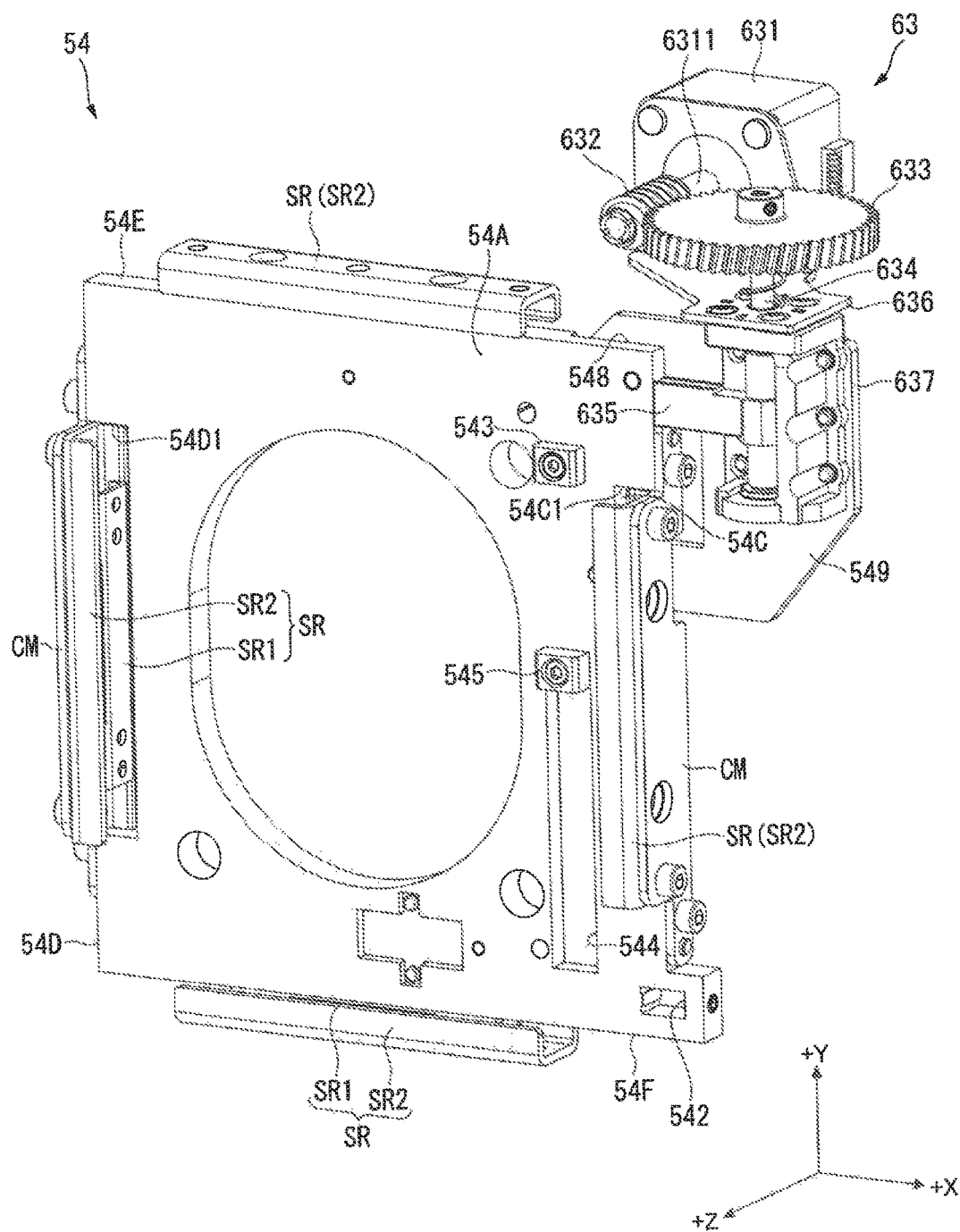
FIG. 17 is a perspective view of the second moving member in the embodiment as viewed from the light-exiting side.
Figure 18:
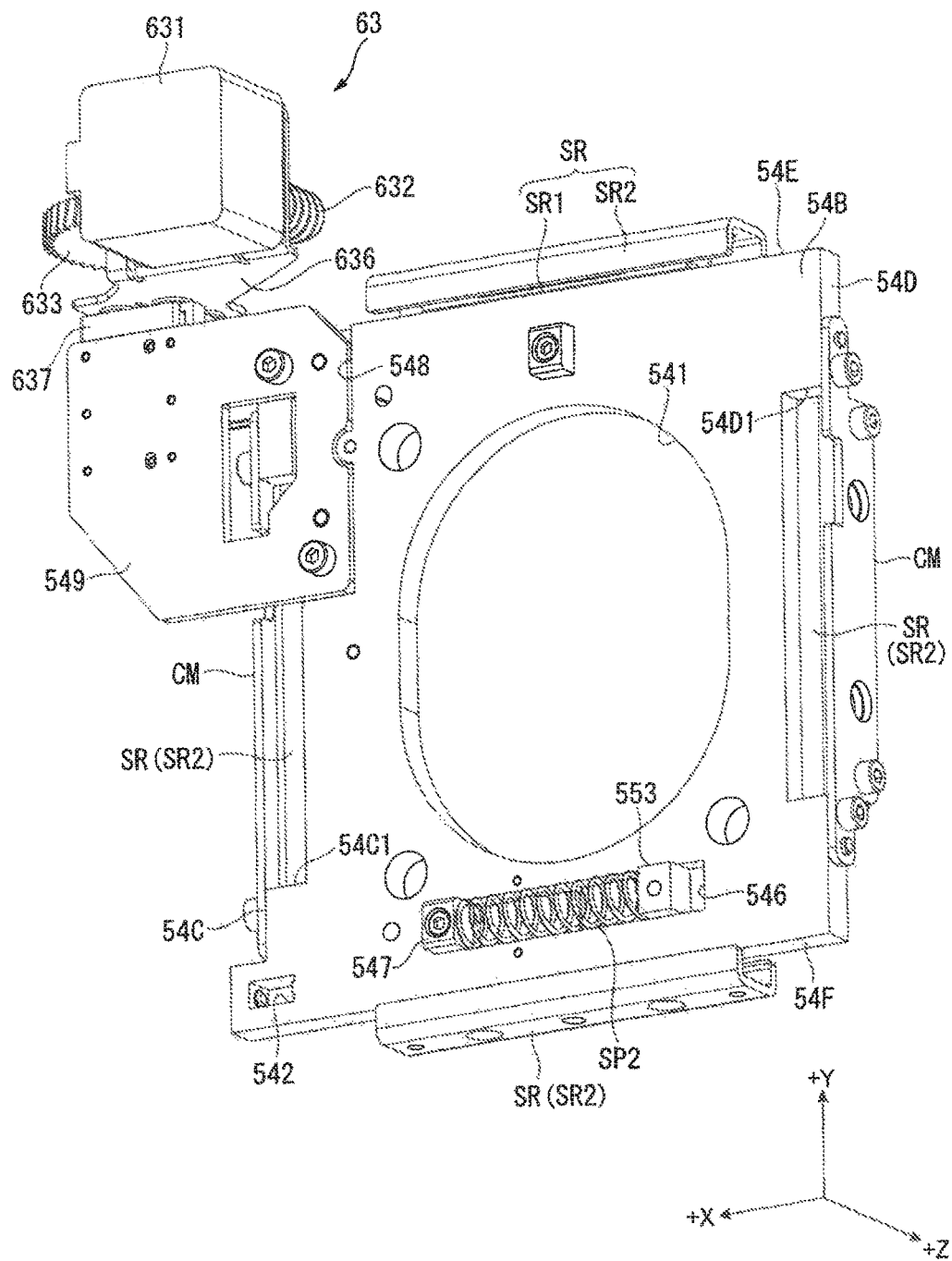
FIG. 18 is a perspective view of the second moving member in the embodiment as viewed from the light-incident side.

FIG. 16 is a perspective view of the second moving member 54 supported by the support member 55, as viewed from the light-exiting side. FIGS. 17 and 18 are perspective views of the second moving member 54 as viewed from the light-exiting side and the light-incident side, respectively.

The second moving member 54 movably supports the first moving member 53 along the +Y direction and is linearly movably supported by the support member 55. The second moving member 54 is moved along the +X direction by the fourth drive device 64, thereby adjusting the shift amount of the central axis of the projection optical device 46 with respect to the illumination optical axis Ax and thus the position of a projection image on the projection surface.

As shown in FIGS. 16 to 18, the second moving member 54 is formed in a substantially rectangular plate shape. An opening 541 having an oval shape with its major axis along the +Y direction is formed in the center of the second moving member 54. Similarly to the above, the lens barrel 461 is inserted through the opening 541.

A substantially rectangular opening 542 is formed at a portion on the +X direction side and the −Y direction side in the second moving member 54. As shown in FIG. 16, a moving piece 645 of the fourth drive device 64 attached to the support member 55 is inserted into the opening 542. With the moving piece 645 moving to the −X direction side or the +X direction side, the second moving member 54 is linearly moved to the −X direction side or the +X direction side with respect to the support member 55.

As shown in FIGS. 16 and 17, the sliding member 543 is provided at a position on the +X direction side and the +Y direction side on an end surface 54A on the light-exiting side (the +Z direction side) in the second moving member 54. In addition, a recess 544 having a substantially rectangular shape elongated in the +Y direction is formed at a position on the +X direction side and the −Y direction side in the end surface 54A. The recess 544 faces the recess 536. A portion of the compression coil spring SP1 (see FIG. 15) on the −Z direction side is disposed in the recess 544. The fixed member 545 against which the end portion on the +Y direction side in the compression coil spring SP1 abuts is fixed to an end portion on the +Y direction side in the recess 544.

Recesses 54C1 and 54D1 recessed on the center side of the second moving member 54 are formed substantially in the center of an end surface 54C on the +X direction side and the center of an end surface 54D on the −X direction side in the second moving member 54. The slide rails SR whose inner rails SR1 are attached to the first moving member 53 are respectively disposed in the recesses 54C1 and 54D1.

The coupling members CM coupled to the outer rails SR2 of the slide rails SR are fixed to portions outside the recesses 54C1 and 54D1 in the end surfaces 54C and 54D. With this configuration, the first moving member 53 is linearly movably supported by the second moving member 54 along the +Y direction.

The inner rails SR1 of the slide rails SR coupled to the support member 55 via the coupling members CM are respectively fixed substantially at the center of an end surface 54E on the +Y direction side and the center of an end surface 54F on the −Y direction side in the second moving member 54.

As shown in FIG. 18, a recess 546 having a substantially rectangular shape with its longitudinal direction along the +X direction is formed at a portion on the −Y direction side in an end surface 54B on the light-incident side (the −Z direction side) in the second moving member 54. A fixed member 547 against which an end portion on the +X direction side in a compression coil spring SP2 as a biasing member disposed in the recess 546 abuts is attached to an end portion on the +X direction side in the recess 546. On the other hand, an end portion on the −X direction side in the compression coil spring SP2 abuts against a fixed member 553 fixed to the support member 55. The second moving member 54 is biased by the compression coil spring SP2 to the +X direction side with respect to the support member 55, and thereby, as shown in FIG. 16, a gap is prevented from being generated between the moving piece 645 of the fourth drive device 64 fixed to the support member 55 and an edge (edge on the −X direction side) of the opening 542.

A substantially rectangular shaped recess 548 is formed at a corner on the +X direction side and the +Y direction side in the end surface 54B. A holding plate 549 by which the third drive device 63 is held is attached to the recess 548. The third drive device 63 will be described in detail later.

Configuration of Support Member

Figure 19:
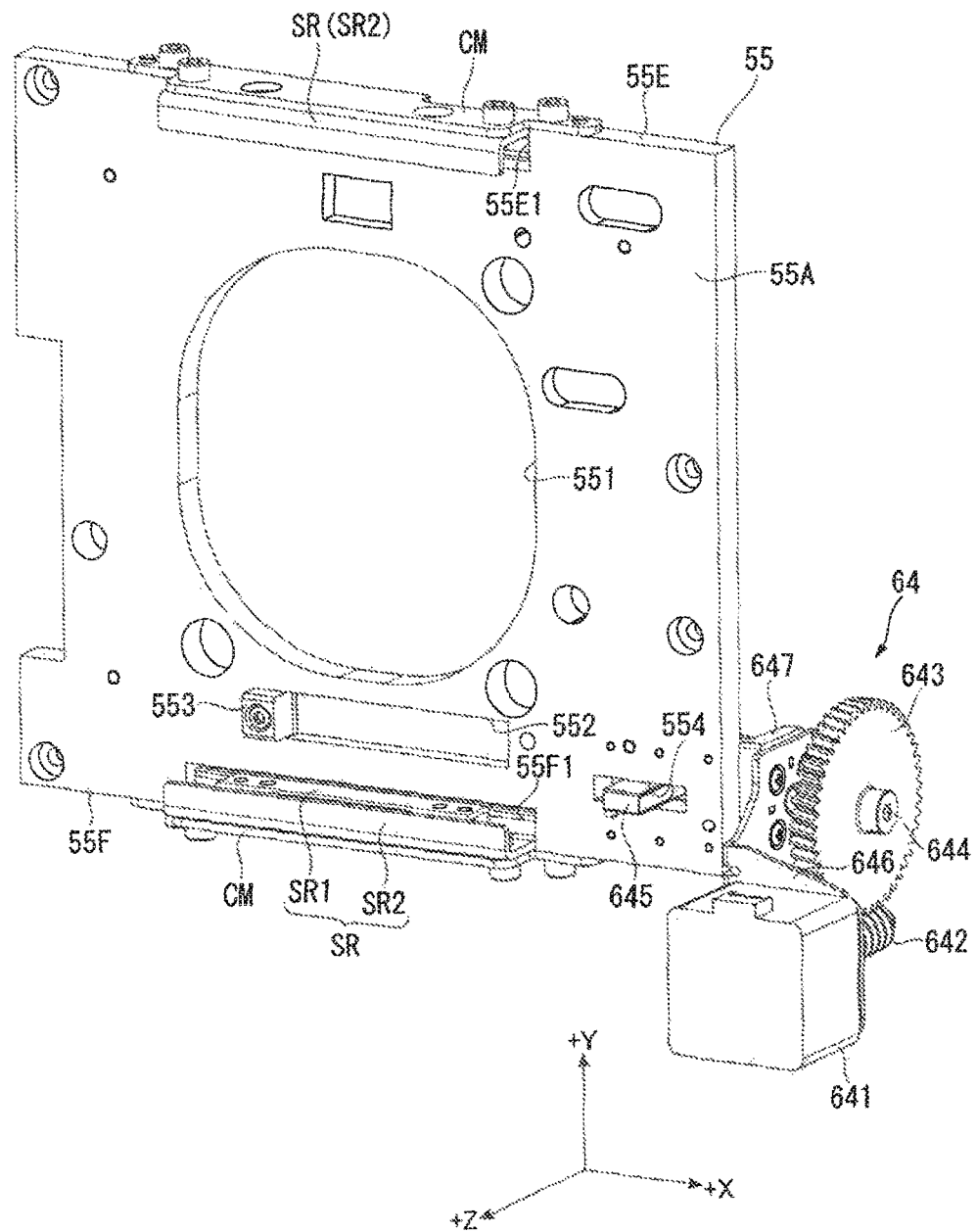
FIG. 19 is a perspective view of the support member in the embodiment as viewed from the light-exiting side.
Figure 20:
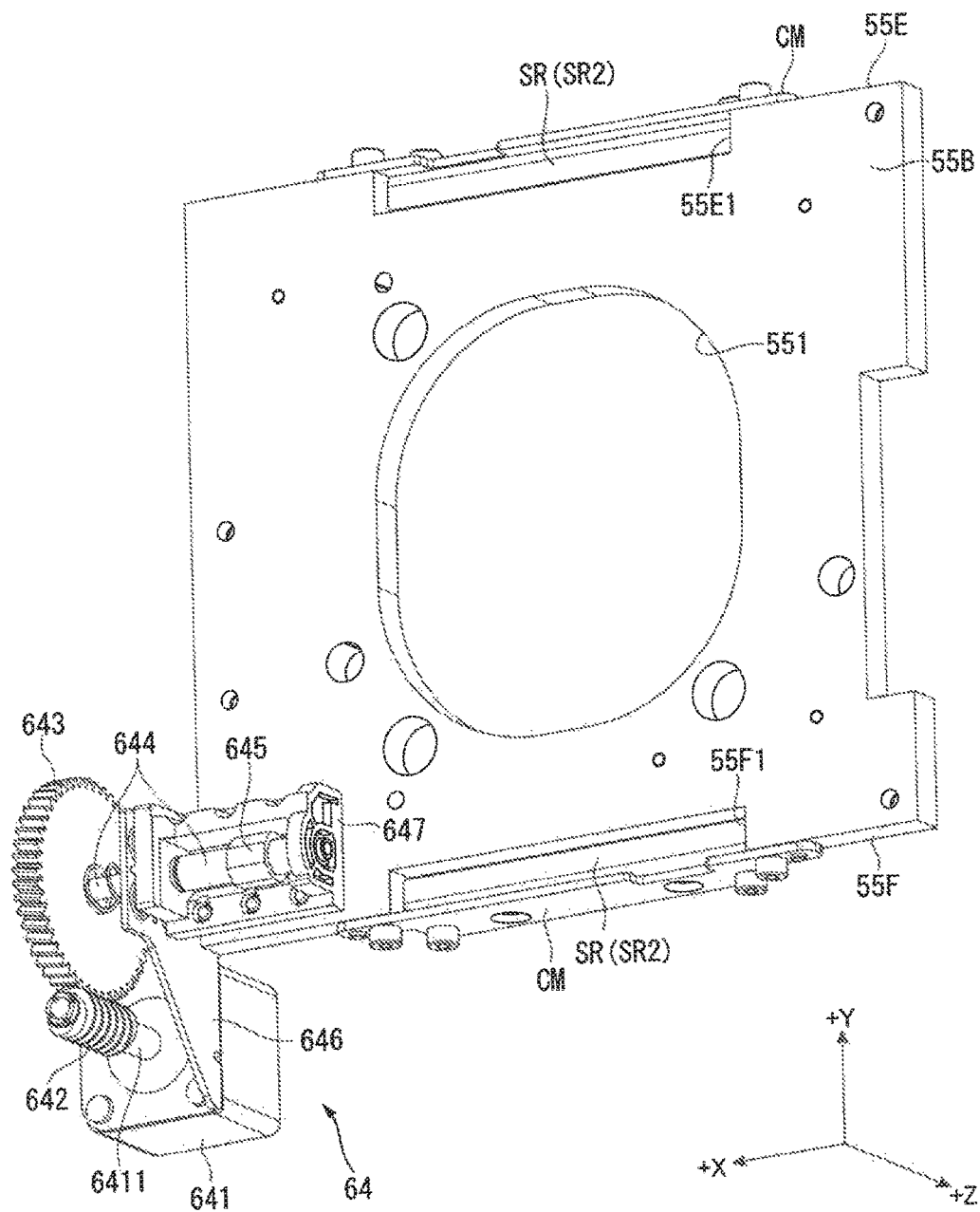
FIG. 20 is a perspective view of the support member in the embodiment as viewed from the light-incident side.

FIGS. 19 and 20 are perspective views of the support member 55 as viewed from the light-exiting side and the light-incident side, respectively.

The support member 55 is fixed to the inner surface of the bottom surface portion 22 (FIG. 1) and linearly movably supports the second moving member 54 along the +X direction. In other words, the support member 55 supports the members 51 to 54. As shown in FIGS. 19 and 20, the support member 55 is configured in a substantially rectangular plate shape. An opening 551 having an oval shape whose dimensions along the +X direction and the +Y direction are substantially the same is formed substantially in the center of the support member 55. Similarly to the above, the lens barrel 461 is inserted through the opening 551.

As shown in FIG. 19, a recess 552 having a substantially rectangular shape elongated in the +X direction is formed, at a portion on the −Y direction side with respect to the opening 551, in an end surface 55A on the light-exiting side (the +Z direction side) in the support member 55. The recess 552 faces the recess 546. A portion of the compression coil spring SP2 (see FIG. 18) on the −Z direction side is disposed in the recess 552. A fixed member 553 against which an end portion on the −X direction side in the compression coil spring SP2 abuts is fixed to an end portion on the −X direction side in the recess 552.

As shown in FIGS. 19 and 20, recesses 55E1 and 55F1 recessed on the center side of the support member 55 are formed substantially at the center of an end surface 55E on the +Y direction side and the center of an end surface 55F on the −Y direction side in the support member 55. The slide rails SR whose inner rails SR1 are attached to the second moving member 54 are respectively disposed in the recesses 55E1 and 55F1.

The coupling members CM coupled to the outer rails SR2 of the slide rails SR are respectively fixed at positions interposing the recesses 55E1 and 55F1 on the end surfaces 55E and 55F. With this configuration, the second moving member 54 is linearly movably supported by the support member 55 along the +X direction.

As shown in FIG. 20, the fourth drive device 64 moving the second moving member 54 is attached to a corner on the +X direction side and the −Y direction side on an end surface 55B on the light-incident side (the −Z direction side) in the support member 55. As shown in FIG. 19, the moving piece 645 of the fourth drive device 64 projects to the +Z direction side through a through-hole 554 formed at the corner on the +X direction side and the −Y direction side in the support member 55 and is inserted into the opening 542 of the second moving member 54. With the moving piece 645 moving to the +X direction side or the −X direction side, the second moving member 54 is linearly moved to the +X direction side or the −X direction side with respect to the support member 55.

The through-hole 554 is formed in a rectangular shape with its longitudinal direction along the +X direction. The inside diameter of the through-hole 554 along the +X direction is set larger than the dimension of the moving piece 645 along the +X direction. By the through-hole 554, the range of movement of the moving piece 645 is defined, and thus the range of movement of the second moving member 54 in the +X direction is defined.

Arrangement of Drive Devices

Each of the drive devices 61 to 64 rotates or linearly moves a corresponding member of the members 51 to 54. As shown in FIGS. 3 to 5, the drive devices 61 to 64 are disposed according to four sides in the adjusting device 5 configured in a substantially rectangular shape as viewed from the +Z direction side. Specifically, the first drive device 61 is disposed according to a side located on the −Y direction side, in the two sides along the +X direction. The second drive device 62 is disposed according to a side located on the −X direction side, in the two sides along the +Y direction. The third drive device 63 is disposed according to a side located on the +Y direction side, in the two sides along the +X direction. The fourth drive device 64 is disposed according to a side located on the +X direction side, in the two sides along the +Y direction.

Hereinafter, the configurations of the drive devices 61 to 64 will be described.

Configuration of First Drive Device

Figure 21:
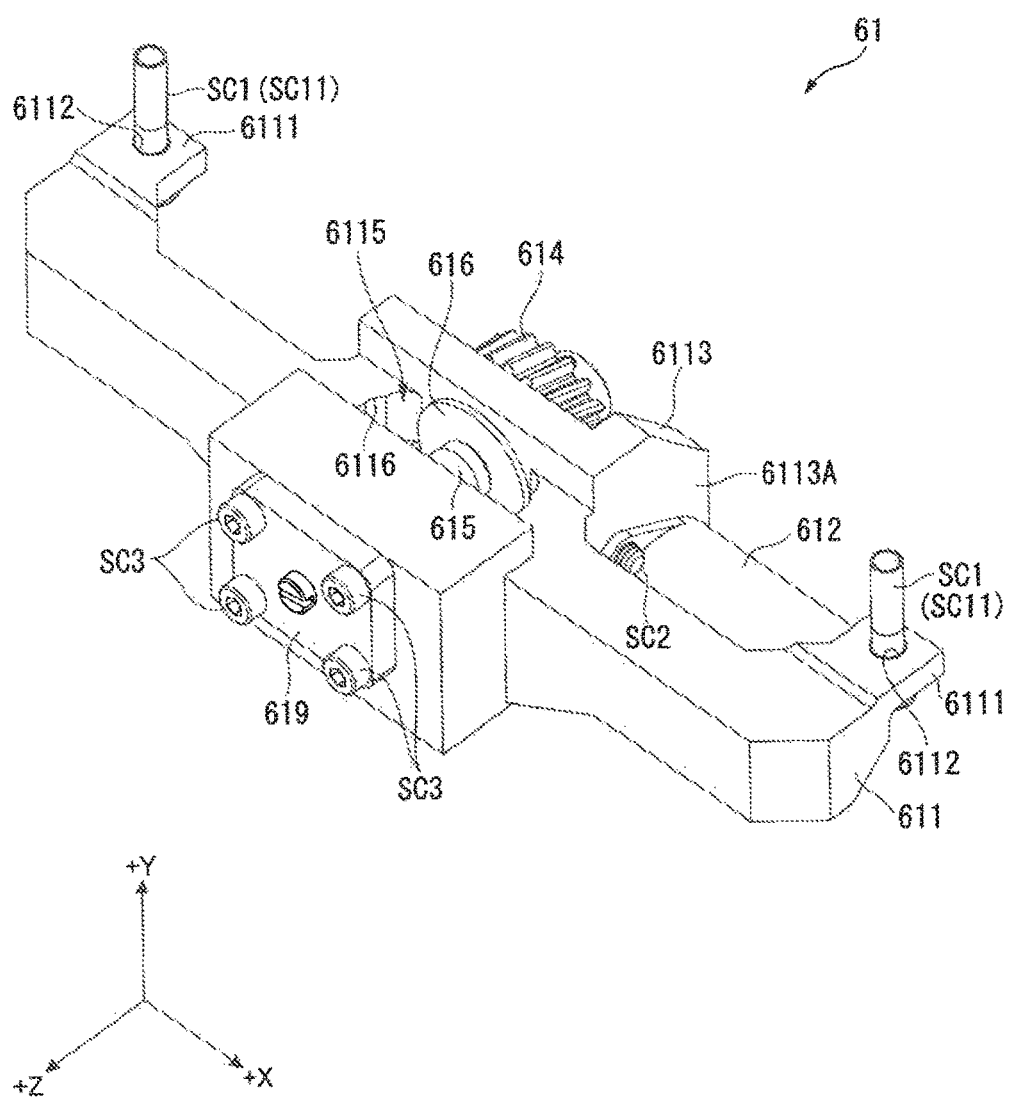
FIG. 21 is a perspective view of a first drive device in the embodiment as viewed from the light-exiting side.
Figure 22:
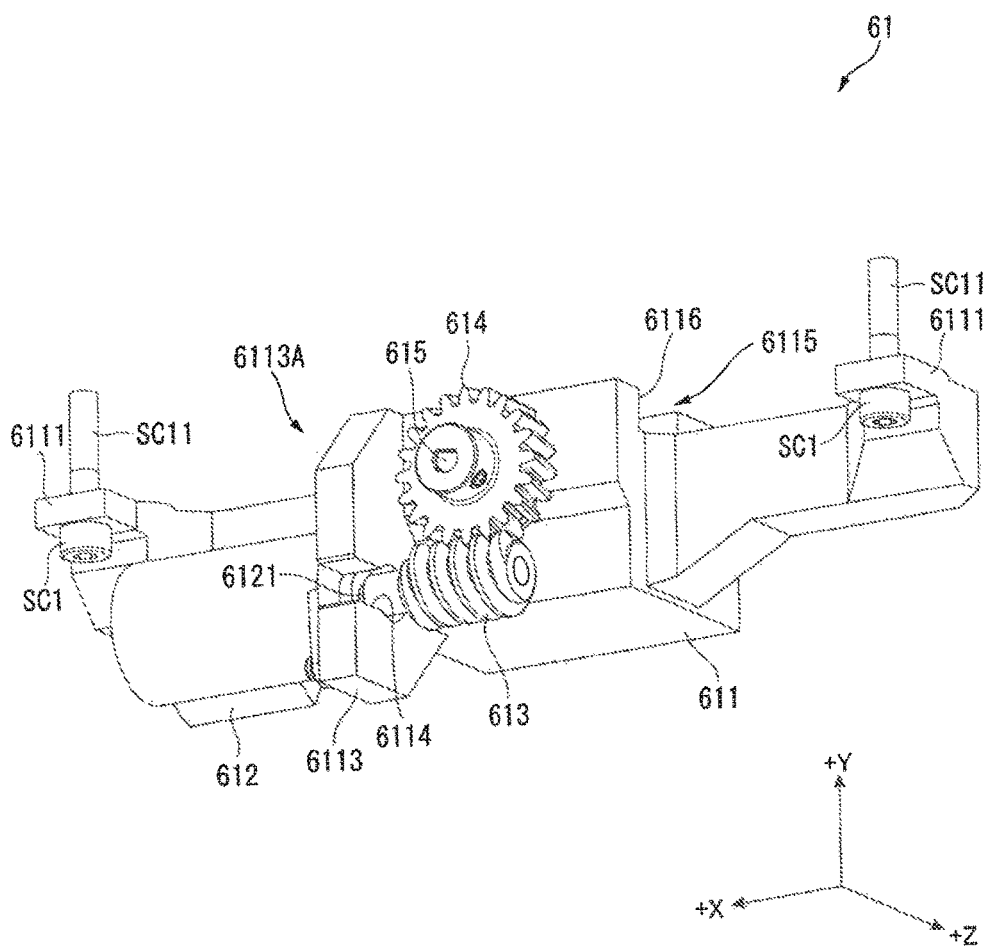
FIG. 22 is a perspective view of the first drive device in the embodiment as viewed from the light-incident side.
Figure 23:
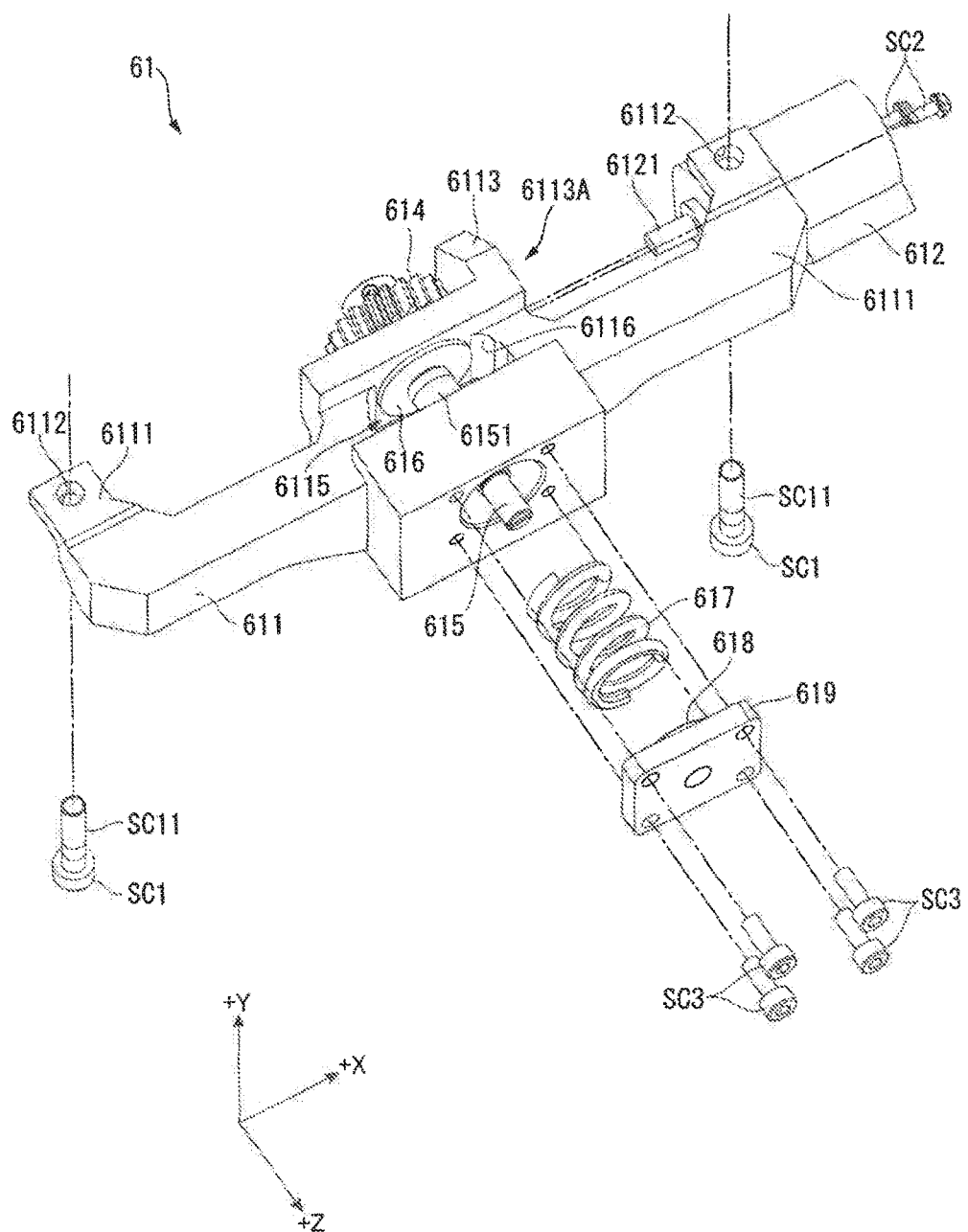
FIG. 23 is an exploded perspective view showing the first drive device in the embodiment.
Figure 24:
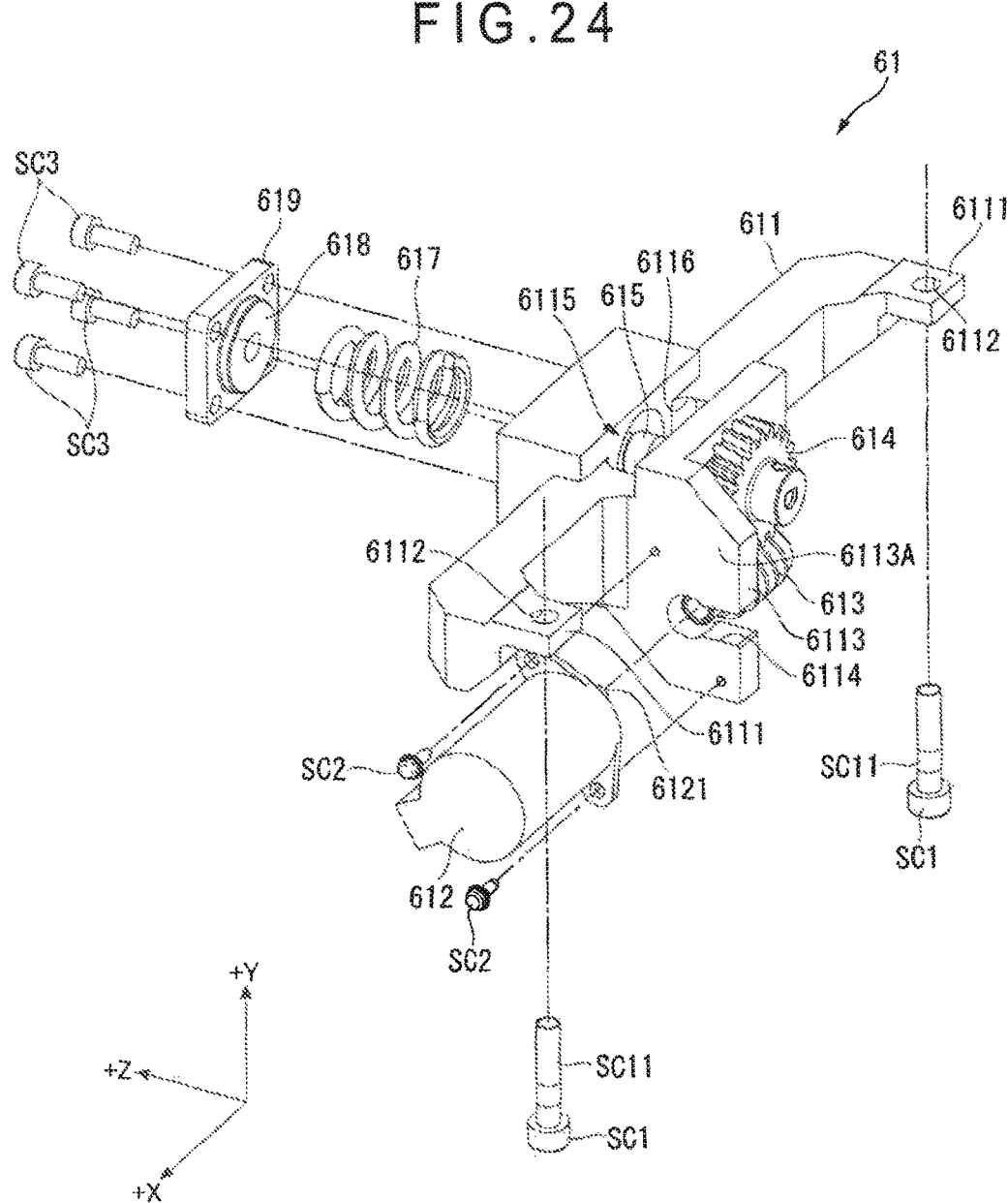
FIG. 24 is an exploded perspective view showing the first drive device in the embodiment.

FIGS. 21 and 22 are perspective views of the first drive device 61 as viewed from the light-exiting side and the light-incident side, respectively. FIGS. 23 and 24 are exploded perspective views of the first drive device 61 as viewed from the light-exiting side and the light-incident side, respectively.

As described above, the first drive device 61 is a drive device that is fixed to the second rotating member 52 and rotates the first rotating member 51 about the rotation shaft portions 517 (the rotation axis RX). As shown in FIGS. 21 to 24, the first drive device 61 includes a container 611, a motor 612, a worm 613, a worm wheel 614, the shaft member 615, a ball bearing 616, the biasing member 617, a ball bearing 618, a locking member 619, and a plurality of screws SC1 to SC3. The configurations of the first drive device 61, except for the motor 612 and the screws SC1 to SC3, constitute a transmission device that rotates the first rotating member 51 with power generated by the motor 612 as a power generating device.

As shown in FIGS. 21 and 23, the container 611 is formed in a substantially W-shape as viewed from the +Y direction side. The container 611 includes fixed portions 6111, holes 6112, a fixed portion 6113, a penetrating portion 6114, an arrangement portion 6115, and an opening 6116.

The fixed portions 6111 are respectively provided at both ends on the +X direction side and the −X direction side. The hole 6112 through which a shaft portion SC11 of the screw SC1 can be inserted along the thickness dimension (the +Y direction) of the container 611 is formed in each of the fixed portions 6111. The screws SC1 whose shaft portions SC11 are inserted through the holes 6112 are fixed to the projecting portion 523 of the second rotating member 52 from the −Y direction side, so that the container 611 and thus the first drive device 61 are fixed to the second rotating member 52.

The fixed portion 6113 is located at the central portion of the container 611 in the +X direction. The fixed portion 6113 is a projecting portion projecting to the −Z direction side. The motor 612 is fixed to an end surface 6113A on the +X direction side in the projecting portion with the screw SC2.

The penetrating portion 6114 is formed so as to penetrate the fixed portion 6113 along the +X direction. A spindle 6121 of the motor 612 fixed to the end surface 6113A is inserted through the penetrating portion 6114. The spindle 6121 is inserted into the worm 613 disposed on the −X direction side with respect to the fixed portion 6113.

The arrangement portion 6115 is formed inside the container 611 at the central portion of the container 611 in the +X direction. The arrangement portion 6115 is a portion that penetrates the container 611 along the +Z direction. The shaft member 615, the ball bearings 616 and 618, and the biasing member 617 are disposed inside the arrangement portion 6115.

The opening 6116 is formed according to the arrangement portion 6115 and exposes the shaft member 615 disposed in the arrangement portion 6115 on the +Y direction side. The projecting portion 518 engaging with the shaft member 615 is inserted into the opening 6116.

The motor 612 generates power to rotate the first rotating member 51. The motor 612 includes the spindle 6121 projecting to the −X direction side. The spindle 6121 is inserted through the penetrating portion 6114 to be inserted into the worm 613. For this reason, when the motor 612 is driven to rotate the spindle 6121, the worm 613 rotates in the same direction as the spindle 6121.

The worm wheel 614 meshes with the worm 613 to convert the rotation of the worm 613 about the rotation axis along the +X direction to the rotation about the rotation axis along the +Z direction. The shaft member 615 is inserted through the center of the worm wheel 614. As the worm wheel 614 rotates, the shaft member 615 is rotated in the same direction. That is, the shaft member 615 is provided coaxially with the worm wheel 614, and the rotation axes of the shaft member 615 and the worm wheel 614 are coaxial.

A spiral groove 6151 (see FIG. 25) is formed on the outer periphery of the shaft member 615. The shaft member 615 is inserted through the through-hole 5181 formed in the projecting portion 518 of the first rotating member 51.

The ball bearing 616 is fixed in the arrangement portion 6115 of the container 611, and the shaft member 615 is inserted through the ball bearing 616. The ball bearing 616 is used to rotatably dispose the shaft member 615 in the arrangement portion 6115.

The biasing member 617 abuts against the step portion 5182 of the projecting portion 518 to bias the first rotating member 51 to the −Z direction side, thereby preventing a gap from being generated between the edge of the through-hole 5181 and the spiral groove 6151 of the shaft member 615 inserted into the through-hole 5181. The biasing member 617 is composed of a compression coil spring in the embodiment.

Similarly to the ball bearing 616, the ball bearing 618 is used to rotatably dispose the shaft member 615 in the arrangement portion 6115.

The locking member 619 is fixed to the container 611 with the screws SC3 so as to close an opening on the +Z direction side in the arrangement portion 6115. The locking member 619 holds the ball bearing 618 abutting against an end portion on the +Z direction side in the biasing member 617, and maintains the abutting state between the biasing member 617 and the step portion 5182 (the first rotating member 51).

Figure 25:
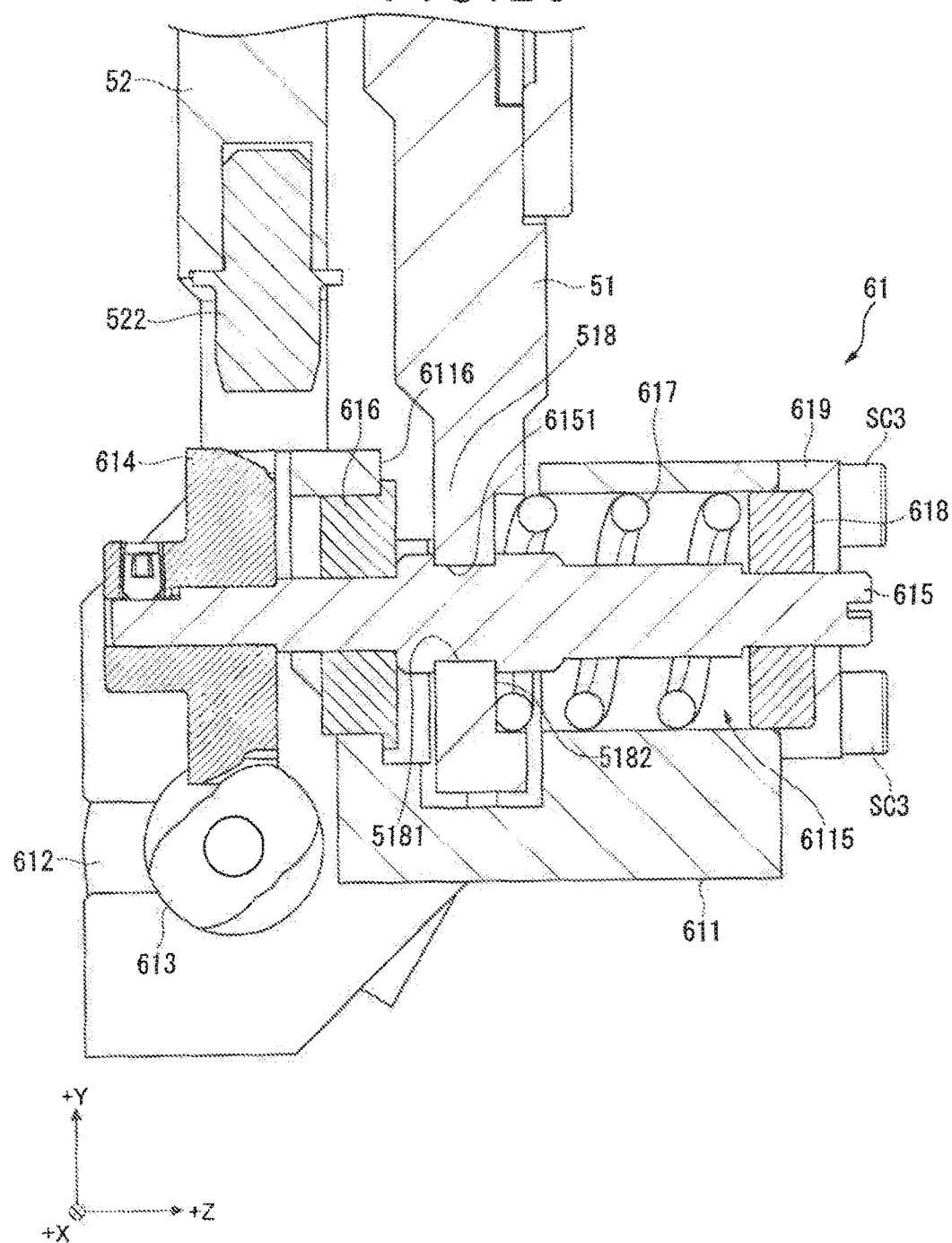
FIG. 25 is a cross-sectional view showing the first rotating member and the first drive device in the embodiment.

FIG. 25 is a diagram showing cross-sections of the first rotating member 51 and the first drive device 61 in an enlarged manner.

In the first drive device 61 as shown in FIG. 25, the edge of the through-hole 5181 of the first rotating member 51 biased to the −Z direction side by the biasing member 617 is fit into the spiral groove 6151 of the shaft member 615. The first rotating member 51 is supported by the second rotating member 52 in the state where the rotation of the first rotating member 51 about the rotation axis along the +Z direction is restrained.

For this reason, when the motor 612 is driven and the rotation of the spindle 6121 along the +X direction is transmitted to the shaft member 615 via the worm 613 and the worm wheel 614 to rotate the shaft member 615, the projecting portion 518 in which the through-hole 5181 is formed moves to the +Z direction side.

The first rotating member 51 is supported by the second rotating member 52 at the rotation shaft portions 517 constituting the rotation axis RX (see FIG. 3). For this reason, the first rotating member 51 rotates about the rotation axis RX, and thereby the projection optical device 46 (the lens barrel 461) is inclined with respect to the XY plane.

On the other hand, when the rotation of the spindle 6121 is in the opposite direction, the shaft member 615 rotates opposite to that described above to move the projecting portion 518 to the −Z direction side. With this configuration, the first rotating member 51 rotates about the rotation axis RX in the direction opposite to that described above, and the projection optical device 46 (the lens barrel 461) is inclined with respect to the XY plane.

Configuration of Second Drive Device

As described above, the second drive device 62 is a drive device that is fixed to the first moving member 53 and rotates the second rotating member 52 supported by the first moving member 53 about the rotation shaft portions 522 (see FIG. 11) constituting the rotation axis RY.

As shown in FIGS. 14 and 15, the second drive device 62 includes a container 621, a motor 622, a worm 623, a worm wheel 624, the shaft member 625, a ball bearing 626, a biasing member (not shown), a ball bearing (corresponding to the ball bearing 618; not shown), a locking member 629, and screws SC1 to SC3, which are similar to those of the first drive device 61. The configurations of the second drive device 62, except for the motor 622 and the screws SC1 to SC3, constitute a transmission device that rotates the second rotating member 52 with power generated by the motor 622 as a power generating device.

Similarly to the container 611, the container 621 includes fixed portions 6211, holes (not shown), a fixed portion 6213, a penetrating portion 6214, an arrangement portion 6215, and an opening 6216. The second drive device 62 is disposed such that a spindle 6221 of the motor 622 is along the +Y direction.

The projecting portion 524 (see FIGS. 11 and 12) of the second rotating member 52 is inserted into the opening 6216 from the +X direction side. In the state where an end portion of the biasing member abuts against the step portion 5242 of the projecting portion 524, the shaft member 625 is inserted through the through-hole 5241 such that the edge of the through-hole 5241 is fit into a spiral groove of the shaft member 625.

When the motor 622 is driven in the state where the second drive device 62 and the second rotating member 52 are combined together and the shaft member 625 is rotated with the rotation of the spindle 6221 along the +Y direction via the worm 623 and the worm wheel 624, the projecting portion 524 moves to the +Z direction side.

The second rotating member 52 is supported to the first moving member 53 by the rotation shaft portions 522 (see FIGS. 11 and 12) constituting the rotation axis RY (see FIGS. 3 to 5). For this reason, the second rotating member 52 rotates about the rotation axis RY, and thereby the projection optical device 46 (the lens barrel 461) is inclined with respect to the XY plane.

On the other hand, when the rotation of the spindle 6221 is in the opposite direction, the shaft member 625 rotates opposite to that described above and the projecting portion 524 moves to the −Z direction side. With this configuration, the second rotating member 52 rotates about the rotation axis RY in the direction opposite to that described above, and is inclined with respect to the XY plane of the lens barrel 461 of the projection optical device 46.

As shown in FIG. 4, when the adjusting device 5 is viewed from the light-exiting side (the +Z direction side), the shortest distance between the rotation axis RX of the first rotating member 51 and the shaft member 615 of the first drive device 61 rotating the first rotating member 51 is the same as the shortest distance between the rotation axis RY of the second rotating member 52 and the shaft member 625 of the second drive device 62 rotating the second rotating member 52. For this reason, the first rotating member 51 and the first drive device 61 can have the same basic structure as the second rotating member 52 and the second drive device 62, and in addition, the rotation amounts (rotation angles) of the first rotating member 51 and the second rotating member 52 when the motors 612 and 622 are driven at the same level can be at the same value. Accordingly, the structure of the adjusting device 5 and rotation amount control can be simplified.

In the configuration of the first drive device 61 described above, when the moving amount of the projecting portion 518 of the first rotating member 51 in the ±Z directions is large, the edge of the through-hole 5181 and the spiral groove 6151 of the shaft member 615 mesh with each other and there is a possibility that a further movement of the projecting portion 518 is limited.

Similarly, in the configuration of the second drive device 62, when the moving amount of the projecting portion 524 of the second rotating member 52 in the ±Z directions is large, the edge of the through-hole 5241 and the spiral groove of the shaft member 625 mesh with each other and there is a possibility that a further movement of the projecting portion 524 is limited.

In the embodiment, however, since the adjustment amount of inclination of the projection optical device 46 adjusted by rotating the first rotating member 51 and the second rotating member 52 is small, the problems described above do not occur.

Configuration of Third Drive Device

As described above, the third drive device 63 is a drive device that is fixed to the second moving member 54 and moves the first moving member 53 supported by the second moving member 54 along the +Y direction. As shown in FIGS. 13, 16, and 17, the third drive device 63 includes: a motor 631 as a power generating device; a worm 632, a worm wheel 633, a shaft member 634, and the moving piece 635, which constitute a transmission device; a first holding member 636; and a second holding member 637.

The motor 631 includes a spindle 6311 disposed so as to be along the +Z direction.

The worm 632 is connected with the spindle 6311 and rotates together with the spindle 6311.

The worm wheel 633 meshes with the worm 632, and rotates about the rotation axis along the +Y direction as the worm 632 rotates about the rotation axis along the +Z direction.

The shaft member 634 is inserted into the worm wheel 633 such that the central axis of the shaft member 634 coincides with the rotation axis of the worm wheel 633, and rotates together with the worm wheel 633.

The moving piece 635 engages with the shaft member 634, and moves to the +Y direction side or the −Y direction side as the shaft member 634 rotates. The moving piece 635 is inserted into the recess 534 of the first moving member 53 as described above.

The first holding member 636 holds the motor 631 and the worm 632. The first holding member 636 is screw-fixed to the second holding member 637.

The second holding member 637 rotatably supports the worm wheel 633 and the shaft member 634, and the first holding member 636 is fixed to the second holding member 637. Further, the second holding member 637 is fixed to the holding plate 549 attached to the end surface 54B of the second moving member 54.

In the third drive device 63, when the motor 631 is driven to rotate the spindle 6311 along the +Z direction, the rotational force of the spindle 6311 is transmitted via the worm 632 and the worm wheel 633 to the shaft member 634 along the +Y direction. When the shaft member 634 rotates, the moving piece 635 inserted into the recess 534 moves in the +Y direction and thereby the first moving member 53 moves in the +Y direction with respect to the second moving member 54.

On the other hand, when the motor 631 is driven to rotate the spindle 6311 in the direction opposite to that described above, the shaft member 634 rotates in the direction opposite to that described above. With this configuration, the moving piece 635 moves in the −Y direction, and the first moving member 53 moves in the −Y direction with respect to the second moving member 54.

Configuration of Fourth Drive Device

As described above, the fourth drive device 64 is a drive device that is fixed to the support member 55 and moves the second moving member 54 supported by the support member 55 along the +X direction. As shown in FIGS. 19 and 20, the fourth drive device 64 includes: a motor 641 as a power generating device; a worm 642, a worm wheel 643, a shaft member 644, and the moving piece 645, which constitute a transmission device; a first holding member 646; and a second holding member 647, similarly to the third drive device 63. The first holding member 646 holding the motor 641 is fixed to the second holding member 647. The second holding member 647 rotatably supporting the worm wheel 643 and the shaft member 644 is fixed to an end surface 55B on the −Z direction side in the support member 55.

In the fourth drive device 64, when the motor 641 is driven, the rotational force of a spindle 6411 (spindle 6411 of the motor 641) along the +Z direction is transmitted via the worm 642 and the worm wheel 643 to the shaft member 644 along the +X direction. When the shaft member 644 rotates, the moving piece 645 inserted through the through-hole 554 to be inserted into the opening 542 moves in the +X direction as shown in FIG. 17 and thereby the second moving member 54 moves in the +X direction with respect to the support member 55.

On the other hand, when the motor 641 is driven to rotate the spindle 6411 in the direction opposite to that described above, the shaft member 644 rotates in the direction opposite to that described above. With this configuration, the moving piece 645 moves in the −X direction, and the second moving member 54 moves in the −X direction with respect to the support member 55.

Setting Positions of Rotation Axes of First Rotating Member and Second Rotating Member The setting positions of the rotation axes RX and RY of the first rotating member 51 and the second rotating member 52 will be described.

As shown in FIGS. 3 to 5, the rotation axis RX of the first rotating member 51 is set within the range of the effective diameter of the projection optical device 46 in the +Y direction orthogonal to the +X direction along which the rotation axis RX is situated and the +Z direction along which the central axis CX is situated as viewed from the +Z direction side (the light-exiting side).

According to this configuration, when the first rotating member 51 is rotated about the rotation axis RX along the +X direction, the moving amount of the first rotating member 51 in the +Z direction can be reduced compared to the case where the rotation axis RX is set outside the above range. Accordingly, even when the first rotating member 51 is rotated about the rotation axis RX, the liquid crystal panel 453 as a light modulating device can be located within the allowable range of the back focus position of the projection optical device 46.

In the embodiment, the rotation axis RX is set so as to be orthogonal to the central axis CX of the projection optical device 46 within the above range as viewed from the +Z direction side (the light-exiting side). For this reason, the moving amounts of the end portions of the projection optical device 46 on the ±Y direction sides can be reduced. In the embodiment, the modulated light incident on the projection optical device 46 passes through the region on the −Y direction side of the central axis CX of the projection optical device 46 and is tilt-projected to the +Y direction side by the projection optical device 46. Because of this fact, it is important in locating the liquid crystal panel 453 as a light modulating device within the allowable range of the back focus position of the projection optical device 46 that the moving amount of the end portion on the −Y direction side be small. In addition, since the rotation axis RX is orthogonal to the central axis CX as described above, the moving amount of the projection optical device 46 (especially the end portions on the ±Y direction sides) to the ±Z direction sides can be reduced even when the first rotating member 51 is rotated to incline the projection optical device 46 with respect to the XY plane. Accordingly, the liquid crystal panel 453 can be reliably located within the allowable range of the back focus position of the projection optical device 46.

Similarly, as shown in FIGS. 3 and 4, the rotation axis RY of the second rotating member 52 is set within the range of the effective diameter of the projection optical device 46 in the +X direction orthogonal to the +Y direction along which the rotation axis RY is situated and the +Z direction along which the central axis CX is situated as viewed from the +Z direction side (the light-exiting side). In the embodiment, the rotation axis RY is set so as to be orthogonal to the central axis CX of the projection optical device 46 within the above range as viewed from the +Z direction side (the light-exiting side).

With this configuration, similarly to the above, even when the second rotating member 52 is rotated about the rotation axis RY to be inclined with respect to the XY plane, the liquid crystal panel 453 can be located within the allowable range of the back focus position of the projection optical device 46.

In view of the above point of view, the rotation axes RX and RY may be set so as to pass through the passing region of the modulated light in the projection optical device 46.

Advantageous Effects of Embodiment

According to the projector 1 according to the embodiment described above, the following advantageous effects are provided.

In the first drive device 61 provided on the second rotating member 52 as a support member rotatably supporting the first rotating member 51 (a rotating member), the spindle 6121 of the motor 612 is disposed so as to be along the +X direction (the +X direction as the second direction orthogonal to the +Z direction as the first direction). In other words, the spindle 6121 is disposed so as to be along the rotation axis RX of the first rotating member 51. According to this configuration, even when the first rotating member 51 supporting the projection optical device 46 (the lens barrel 461) having a relatively large weight, among the members constituting the projector, unintendedly rotates about the rotation axis RX because of, for example, some impact applied to the projector 1, the projecting portion 518 of the first rotating member 51 moves along a direction orthogonal to the central axis of the spindle 6121. Therefore, the movement of the projecting portion 518 along the central axis of the spindle 6121 does not occur. For this reason, a load along the central axis of the spindle 6121 can be prevented from being applied to the spindle 6121 due to the unintended rotation of the first rotating member 51. Moreover, the spindle 6121 is disposed along the rotation axis RX; therefore, even when the first rotating member 51 unintendedly rotates and a load in the direction orthogonal to the central axis of the spindle 6121 is applied, the spindle 6121 rotates according to the load and thus the load can be relieved. Accordingly, since the adjusting device 5 can be stably operated, the reliability of the projector 1 can be improved.

The advantageous effects described above can be provided similarly in the second drive device 62 rotating, about the rotation axis RY, the second rotating member 52 supporting the projection optical device 46 (the lens barrel 461) via the first rotating member 51. In this case, the second rotating member 52 corresponds to a rotating member according to the invention; the second drive device 62 corresponds to a drive device that rotates the second rotating member 52; and the first moving member 53 corresponds to a support member that supports the second rotating member 52.

The first drive device 61 includes, as the members constituting the transmission device, the worm 613, the worm wheel 614, the shaft member 615, and the container 611. The spiral groove 6151 is formed on the outer periphery of the shaft member 615. The first rotating member 51 includes the projecting portion 518 (the through-hole 5181) as a meshing portion that meshes with the spiral groove 6151.

According to this configuration, since the worm 613 and the worm wheel 614 constitute a worm gear, the rotation axis of the spindle 6121 and the rotation axis of the shaft member 615 can be reliably orthogonal to each other. With this configuration, the motor 612 can be reliably disposed such that the spindle 6121 is along the rotation axis RX of the first rotating member 51.

The spiral groove 6151 of the shaft member 615 rotated by driving of the motor 612 is exposed through the opening 6116 of the container 611 and meshed with the projecting portion 518 of the first rotating member 51. With this configuration, the projecting portion 518 can be moved along the central axis of the shaft member 615 as the shaft member 615 rotates, and thus the first rotating member 51 can be rotated about the rotation axis RX. Accordingly, the inclination of the projection optical device 46 (the lens barrel 461) supported by the first rotating member 51 can be reliably adjusted.

The advantageous effects described above can be provided similarly by the second rotating member 52, the first moving member 53, and the second drive device 62.

The first drive device 61 includes the biasing member 617 biasing the step portion 5182 of the projecting portion 518 along the central axis of the shaft member 615 to maintain the meshing state of the projecting portion 518 and the spiral groove 6151. According to this configuration, a gap can be prevented from being generated between the projecting portion 518 and the spiral groove 6151 by the biasing force of the biasing member 617. Accordingly, the occurrence of rattling when the shaft member 615 is rotated to rotate the first rotating member 51 can be prevented, and the projection optical device 46 (the lens barrel 461) can be stably inclined. Similar advantageous effects can be provided by the second rotating member 52 and the second drive device 62.

In order for the projection optical device 46 to properly project the light modulated by the liquid crystal panel 453 as a light modulating device, the liquid crystal panel 453 is required to be located at the back focus position of the projection optical device 46. However, for example if the rotation axis RX is not set within the range of the effective diameter of the projection optical device 46, the projection optical device 46 moves greatly in the ±Z directions when the projection optical device 46 is rotated about the rotation axis RX. In such a case, there is a risk that the liquid crystal panel 453 may not be located within the allowable range of the back focus position.

In contrast to this, the rotation axis RX is set within the range of the effective diameter of the projection optical device 46 in the +Y direction orthogonal to the +X direction along which the rotation axis RX is situated and the +Z direction. According to this configuration, the projection optical device 46 can be prevented from greatly moving in the ±Z directions when the projection optical device 46 is rotated as described above. Accordingly, the liquid crystal panel 453 as a light modulating device can be reliably located within the allowable range of the back focus position, and the light modulated by the liquid crystal panel 453 can be projected reliably and properly.

Similar advantageous effects can be provided by setting the rotation axis RY within the range of the effective diameter of the projection optical device 46 in the +X direction.

As shown in FIGS. 3 to 5, the rotation axis RX is orthogonal to the central axis CX of the projection optical device 46. According to this configuration, when the projection optical device 46 is rotated about the rotation axis RX, the moving amounts of the ends of the projection optical device 46 in the ±Y directions to the light-incident side or the light-exiting side can be reliably reduced. Accordingly, the liquid crystal panel 453 can be reliably located within the allowable range of the back focus position of the projection optical device 46, and the light modulated by the liquid crystal panel 453 can be projected reliably and properly. Similar advantageous effects can be provided when the rotation axis RY is orthogonal to the central axis CX of the projection optical device 46.

The rotation axis RY (a first rotation axis) of the second rotating member 52 (a first rotating member according to the invention) is along the +Y direction (the second direction) and orthogonal to the central axis CX of the projection optical device 46 supported by the first rotating member 51 of the adjusting device 5. According to this configuration, even when the second rotating member 52 is rotated to rotate the projection optical device 46, the movement of the end portion on the light-incident side in the projection optical device 46 can be reduced. For this reason, the occurrence of shift in the back focus position of the projection optical device 46 can be prevented, and the liquid crystal panel 453 can be easily located within the allowable range of the back focus position of the projection optical device 46. Accordingly, even when the projection optical device 46 is inclined by the second rotating member 52 with respect to the central axis (the illumination optical axis Ax) of the modulated light incident on the projection optical device 46, or when the projection optical device 46 is moved by the first moving member 53 along the −Y direction, the projection of the modulated light (image) by the projection optical device 46 after position adjustment can be properly carried out.

In the second rotating member 52 and the first moving member 53, the first moving member 53 supports the second rotating member 52. According to this configuration, the members 52 and 53 can be integrated together. Accordingly, for example compared to the case where the second rotating member 52 is rotatably provided on one surface of one support member while the first moving member 53 is movably provided on the other surface, the configuration of the adjusting device 5 can be simplified and miniaturized.

In the case where a rotating member that rotates about the rotation axis RX supports a moving member that moves along the +Y direction, when the rotating member is rotated, the moving amount of the moving member, as the adjusting device 5 is viewed from the +Z direction side, varies depending on the rotation amount (rotation angle) of the rotating member. For this reason, the calculation of adjustment amount when adjusting the position of the projection optical device 46 by moving the moving member becomes complicated. The same applies to the case where a rotating member that rotates about the rotation axis RY supports a moving member that moves along the +X direction.

Moreover, in the case where a rotating member that rotates about the rotation axis RX supports a moving member that moves along the +Y direction and the moving member or a configuration provided on the moving member supports the projection optical device 46, when the moving member is moved to an end portion side of the rotating member projecting to the light-exiting side in the rotation of the rotating member, the moving member moved along the inclined rotating member is further shifted to the light-exiting side. Conversely, when the moving member is moved to an end portion side of the rotating member projecting to the light-incident side in the rotation of the rotating member, the moving member is further shifted to the light-incident side. In these cases, the projection optical device is also moved along the first direction as the moving member moves. With this movement, since the back focus position of the projection optical device is also shifted along the first direction, there is a risk that the liquid crystal panel 453 as a light modulating device may not be disposed within the allowable range of the back focus position.

In contrast to this, the first moving member 53 movably supported by the second moving member 54 rotatably supports the second rotating member 52 rotatably supporting the first rotating member 51. For this reason, even when the first moving member 53 is moved in the state where the second rotating member 52 is rotated, the first moving member 53 is moved by the moving amount in the moving direction as viewed along the +Z direction. According to this configuration, even when the first moving member 53 and the second moving member 54 move, the moving amounts of the moving members 53 and 54 and the rotation amounts of the rotating members 51 and 52 can be controlled independently of each other. Accordingly, the position adjustment of the projection optical device 46 to a proper position can be easily carried out.

Moreover, the first moving member 53 and the second moving member 54 are located on the light-incident side (the −Z direction side) with respect to the first rotating member 51 and the second rotating member 52, and the first rotating member 51 supported by the second rotating member 52 supports the projection optical device 46. Therefore, even when the moving members 53 and 54 are moved and further the rotating members 51 and 52 are rotated, the back focus position of the projection optical device 46 can be prevented from being shifted to the light-exiting side (the +Z direction side). Accordingly, the projection of the modulated light by the projection optical device 46 after position adjustment can be properly carried out.

The adjusting device 5 includes, in addition to the second rotating member 52 and the first moving member 53, the first rotating member 51 (a second rotating member according to the invention) configured to rotate about the rotation axis RX (a second rotation axis) orthogonal to the central axis CX along the +X direction (the third direction) so as to be able to rotate the projection optical device 46, and the second moving member 54 configured to move along the +X direction so as to be able to move the projection optical device 46. According to this configuration, the adjustment axis of the projection optical device 46 can be increased. Accordingly, the projection optical device 46 can be disposed at a more proper position.

When the first rotating member 51 and the second rotating member 52 are located on the light-incident side with respect to the first moving member 53 and the second moving member 54 as described above, there is a possibility that the back focus position of the projection optical device 46 may be shifted to the light-exiting side.

In contrast to this, in the adjusting device 5, the second moving member 54, the first moving member 53, the second rotating member 52, and the first rotating member 51 are disposed in order from the incident side of the modulated light incident on the projection optical device 46 and passing through the projection optical device 46. With this configuration, the back focus position can be prevented from being shifted to the light-exiting side. Accordingly, the projection of the modulated light (image) can be properly carried out by the projection optical device 46 after position adjustment.

Since the projection optical device 46 projects an image onto a projection surface, a lens on the light-exiting side in the projection optical device 46 is generally exposed to the outside of the external housing 2. On the other hand, optical components such as light modulating devices that form images are generally disposed densely on the light-incident side with respect to the projection optical device 46. For this reason, when the projection optical device 46 is to be replaced, the projection optical device 46 is considered to be pulled out of the external housing 2 toward the light-exiting side. However, when a locking member that locks the projection optical device 46 is provided on a member located on the light-incident side, pulling out of the projection optical device 46 to the light-exiting side is likely to be complicated, and thus replacement work of the projection optical device 46 is likely to be complicated.

In contrast to this, the first rotating member 51 located closest to the light-exiting side in the traveling direction of the modulated light, among the members 51 to 55 constituting the adjusting device 5, includes the locking member 513 locking the projection optical device 46. According to this configuration, the projection optical device 46 can be easily pulled out from the adjusting device 5 to the light-exiting side, and thus the projection optical device 46 can be easily pulled out of the external housing 2. Accordingly, replacement work of the projection optical device 46 can be simplified.

The drive devices 61 to 64 are respectively disposed according to different side edges, in the four side edges of the adjusting device 5 configured in a substantially rectangular shape (substantially quadrilateral shape) as viewed from the +Z direction side. According to this configuration, components that rotate or move the rotating members 51 and 52 and the moving members 53 and 54 in the drive devices 61 to 64 can be prevented from interfering with each other. Accordingly, the rotation of each of the rotating members 51 and 52 and the movement of each of the moving members 53 and 54 can be reliably carried out, and the position adjustment of the projection optical device 46 can be carried out properly and reliably.

In addition, since the drive devices 61 to 64 can be disposed in a balanced manner in the adjusting device 5, the miniaturization of the adjusting device 5 including the two rotating members 51 and 52 and the two moving members 53 and 54 can be achieved.

Modifications of Embodiment

The invention is not limited to the embodiment. Modifications, improvements, and the like within the scope capable of achieving the advantages of the invention are included in the invention.

In the embodiment, the adjusting device 5 is configured to include the first rotating member 51 rotatable about the rotation axis RX along the +X direction in the state of supporting the projection optical device 46, the second rotating member 52 rotatable about the rotation axis RY along the +Y direction in the state of supporting the first rotating member 51, the first moving member 53 linearly movable along the +Y direction in the state of supporting the second rotating member 52, the second moving member 54 linearly movable along the +X direction in the state of supporting the first moving member 53, and the support member 55. However, the adjusting device 5 is not limited to this configuration. The adjusting device 5 may not include the first moving member 53 and the second moving member 54, and may not include any of the first rotating member 51 and the second rotating member 52. Moreover, the adjusting device 5 may not include one of the first rotating member 51 and the second rotating member 52, and may not include one of the first moving member 53 and the second moving member 54. For example, when the adjusting device 5 does not include the first rotating member 51, the second rotating member 52 may be configured so as to support the lens barrel 461 of the projection optical device 46. For example, the first rotating member 51 may be configured to be rotatable about the rotation axis RY, and the second rotating member 52 may be configured to be rotatable about the rotation axis RX.

Further, the first moving member 53 supporting the second rotating member 52 is not limited to the configuration in which the first moving member 53 is movable along the +Y direction, but may be configured to be movable along the +X direction.

In the embodiment, the rotation axis RX of the first rotating member 51 and the rotation axis RY of the second rotating member 52 cross (are orthogonal to) the central axis CX of the projection optical device 46. However, the rotation axes RX and RY are not limited to this configuration. The rotation axes RX and RY may not be necessarily orthogonal to the central axis CX as long as the rotation axis RX is along the +X direction and the rotation axis RY is along the +Y direction. It is sufficient that the rotation axes RX and RY are set within the range of the effective diameter of the projection optical device 46. Further, at least any of the rotation axes RX and RY may be set outside the range of the effective diameter.

In the embodiment, the first moving member 53 supports the second rotating member 52. However, the invention is not limited to this configuration. The second rotating member 52 may be configured to support the first moving member 53, and the first moving member 53 may be configured to support the projection optical device 46 (the lens barrel 461). Moreover, the arrangements of the rotating members 51 and 52 and the moving members 53 and 54 can be appropriately changed. When a moving member that linearly moves in a direction orthogonal to the +Z direction supports a rotating member that rotates about a rotation axis along the direction orthogonal to the +Z direction and the moving member is located on the light-incident side with respect to the rotating member, the shift in the back focus position of the projection optical device can be prevented as described above.

In the embodiment, the first rotating member 51 located closest to the light-exiting side includes the locking member 513 locking the lens barrel 461 of the projection optical device 46. However, the invention is not limited to this configuration. Another member, for example, the support member 55 or the second rotating member 52 may include the locking member 513. On the other hand, in the configuration of the adjusting device 5, the opening 511 of the first rotating member 51 located closest to the light-exiting side can be adjusted to the outside diameter dimension of the lens barrel 461; therefore, the locking of the lens barrel 461 by the locking member 513 can be carried out easily and reliably without rattling.

In the embodiment, the drive devices 61 to 64 are provided so as to be disposed according to different side edges, in the four side edges of the adjusting device 5 having a substantially rectangular shape as viewed from the +Z direction side. However, the invention is not limited to this configuration. The drive devices 61 to 64 may be disposed on one side (e.g., the +X direction side) in the adjusting device 5. That is, the arrangement of the drive devices 61 to 64 is not limited to that described above but can be appropriately changed.

In the embodiment, the first drive device 61 is configured to include the container 611, the motor 612, the worm 613, the worm wheel 614, the shaft member 615, the ball bearings 616 and 618, the biasing member 617, the locking member 619, and the plurality of screws SC1 to SC3. However, the first drive device 61 is not limited to this configuration. The first drive device 61 may have other configurations. For example, as a configuration for preventing rattling between the stepped hole 5183 of the projecting portion 518 and the spiral groove 6151 of the shaft member 615, a double nut or a pressure ball screw may be used instead of the biasing member 617. The same applies to the other drive devices 62 to 64.

In the embodiment, the projector 1 includes the three liquid crystal panels 453 (453B, 453G, 453R) as light modulating devices. However, the invention is not limited to this configuration. The invention can be applied to a projector using two or less, or four or more, liquid crystal panels.

In the embodiment, the image forming device 4 is configured in a substantially L-shape shown in FIG. 2. However, the image forming device 4 is not limited to this shape. The image forming device 4 may be configured in another shape such as a substantially U-shape in a plan view.

In the embodiment, the liquid crystal panel 453 of transmission type in which a light-incident surface and a light-exiting surface are different from each other is used as a light modulating device. However, the light modulating device is not limited to this type. A liquid crystal panel of reflection type in which a light-incident surface and a light-exiting surface are identical may be used as a light modulating device. Moreover, a light modulating device other than that of liquid crystal, such as that using a device using a micromirror, for example, that using a digital micromirror device (DMD) may be used as long as the light modulating device can modulate incident luminous flux to form an image in response to image information.

In the embodiment, the light source device 41 is configured to include the arc tube 411 and the main reflection mirror 412. However, the light source device 41 is not limited to this configuration. For example, the light source device 41 may be configured to include a solid-state light source such as a light-emitting diode (LED) or a laser diode (LD). Moreover, the number of light source devices may be two or more.

The entire disclosure of Japanese Patent Applications No. 2016-192016, filed on Sep. 29, 2016 and No. 2016-192017, filed on Sep. 29, 2016 are expressly incorporated by reference herein.

What is claimed is:

1. A projector comprising:
a light source device;
a light modulating device that modulates light emitted from the light source device;
a projection optical device that projects modulated light modulated by the light modulating device and incident on the projection optical device; and
an adjusting device that rotates the projection optical device about a rotation axis along a second direction orthogonal to a first direction along a central axis of the projection optical device to adjust an inclination of the projection optical device with respect to the modulated light incident on the projection optical device, wherein
the adjusting device includes
 a rotating member that supports the projection optical device and rotates about the rotation axis,
 a support member that rotatably supports the rotating member, and
 a drive device that is provided on the support member and rotates the rotating member,
the drive device includes
 a motor that generates power to rotate the rotating member, and
 a transmission device that engages with the rotating member to rotate the rotating member with the power generated by the motor, the motor includes a spindle that engages with the transmission device to transmit the power to the transmission device, and
the spindle is disposed along the rotation axis.

2. The projector according to claim 1, wherein
the transmission device includes
 a worm that is connected to the spindle,
 a worm wheel that meshes with the worm,
 a shaft member that includes a spiral groove on an outer periphery, is provided coaxially with the worm wheel, and rotates together with the worm wheel, and
 a container that is provided on the support member and rotatably accommodates the shaft member,
the container includes an opening through which the spiral groove of the shaft member accommodated is exposed, and
the rotating member includes a meshing portion that meshes with the spiral groove through the opening.

3. The projector according to claim 2, wherein
the transmission device includes a biasing member that biases the meshing portion along the shaft member to maintain a meshing state of the meshing portion and the spiral groove.

4. The projector according to claim 1, wherein
the rotation axis is set within the range of an effective diameter of the projection optical device in a third direction orthogonal to each of the first direction and the second direction.

5. The projector according to claim 4, wherein
the rotation axis is orthogonal to the central axis of the projection optical device.

6. A projector comprising:
a light source device;
a light modulating device that modulates light emitted from the light source device;
a projection optical device that projects modulated light modulated by the light modulating device and incident on the projection optical device; and
an adjusting device that supports the projection optical device and adjusts the position of the projection optical device, wherein
the adjusting device includes, when a direction along a central axis of the projection optical device is defined as a first direction and two directions orthogonal to the first direction and orthogonal to each other are defined as a second direction and a third direction,
 a first rotating member configured to rotate about a first rotation axis that is along the second direction and orthogonal to the central axis so as to be able to rotate the projection optical device, and
 a first moving member configured to move along one of the second direction and the third direction so as to be able to move the projection optical device.

7. The projector according to claim 6, wherein
one member of the first rotating member and the first moving member supports the other member.

8. The projector according to claim 7, wherein
the first moving member supports the first rotating member, and
the first moving member is located on an incident side of the modulated light incident on the projection optical device with respect to the first rotating member.

9. The projector according to claim 6, further comprising:
a second rotating member configured to rotate about a second rotation axis that is along the third direction and orthogonal to the central axis so as to be able to rotate the projection optical device; and a second moving member configured to move along the other of the second direction and the third direction so as to be able to move the projection optical device.

10. The projector according to claim 9, wherein the second moving member, the first moving member, the first rotating member, and the second rotating member are disposed in order from an incident side of the modulated light incident on the projection optical device and passing through the projection optical device.

11. The projector according to claim 9, wherein among the first rotating member, the second rotating member, the first moving member, and the second moving member, a member that is located closest to an exiting side in a traveling direction of the modulated light incident on the projection optical device and passing through the projection optical device includes a locking member that locks the projection optical device.

12. The projector according to claim 9, further comprising:

a first drive device that rotates the first rotating member;

a second drive device that rotates the second rotating member;

a third drive device that moves the first moving member; and a fourth drive device that moves the second moving member, wherein the adjusting device is formed in a substantially quadrilateral shape including four side edges as viewed along the first direction, and the first drive device, the second drive device, the third drive device, and the fourth drive device are respectively disposed according to different side edges in the four side edges.

* * * * *